United States Patent
Shimazawa et al.

(10) Patent No.: US 7,898,909 B2
(45) Date of Patent: *Mar. 1, 2011

(54) THERMAL-ASSISTED MAGNETIC RECORDING HEAD HAVING SUBSTRATE AND LIGHT REFLECTION SECTION

(75) Inventors: Koji Shimazawa, Tokyo (JP); Yasuhiro Ito, Tokyo (JP); Seiichi Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 12/369,991

(22) Filed: Feb. 12, 2009

(65) Prior Publication Data

US 2010/0202081 A1 Aug. 12, 2010

(51) Int. Cl.
G11B 11/00 (2006.01)

(52) U.S. Cl. ............. 369/13.33; 360/59; 369/13.13

(58) Field of Classification Search ........... 369/13.33, 369/13.13, 13.32, 13.17, 112.09, 112.14, 369/112.21, 112.27; 360/59; 385/129, 31, 385/88–94

See application file for complete search history.

(56) References Cited

U.S. PATENT DOCUMENTS

| | | | | |
|---|---|---|---|---|
| 5,986,978 A | * | 11/1999 | Rottmayer et al. | 369/13.17 |
| 6,016,290 A | * | 1/2000 | Chen et al. | 369/13.17 |
| 6,404,706 B1 | * | 6/2002 | Stovall et al. | 369/13.17 |
| 6,795,630 B2 | | 9/2004 | Challener et al. | |
| 6,944,112 B2 | | 9/2005 | Challener | |
| 7,155,732 B2 | * | 12/2006 | Rausch et al. | 720/659 |
| 7,266,268 B2 | | 9/2007 | Challener et al. | |

(Continued)

FOREIGN PATENT DOCUMENTS

JP A-10-162444 6/1998

(Continued)

OTHER PUBLICATIONS

Jun. 30, 2010 Office Action issued in U.S. Appl. No. 12/364,765.

(Continued)

*Primary Examiner*—Tan X Dinh
(74) *Attorney, Agent, or Firm*—Oliff & Berridge, PLC

(57) ABSTRACT

A thermally assisted magnetic head includes a slider having a medium-facing surface and a surface-emitting semiconductor laser. The slider has a slider substrate on which part of the medium-facing surface is formed, and a magnetic head portion, on which another part of the medium-facing surface is formed, and which has a first surface in contact with a head stacking surface of the slider substrate, a second surface opposite the first surface, and a third surface opposite the medium-facing surface. The magnetic head portion comprises a main magnetic pole, an optical waveguide core having a first light exit surface at the medium-facing surface and a second light exit surface at the third surface, a first diffraction grating, provided in the optical waveguide core or further towards the second surface than the optical waveguide core, and a light reflective section provided further toward the first surface than the optical waveguide core. The surface-emitting semiconductor laser is provided opposing the second surface. The first diffraction grating causes part of emission light from the surface-emitting semiconductor laser to be optically coupled to the optical waveguide core.

8 Claims, 17 Drawing Sheets

U.S. PATENT DOCUMENTS

| | | | |
|---|---|---|---|
| 7,580,602 | B2* | 8/2009 | Itagi et al. ................... 385/37 |
| 2004/0001420 | A1* | 1/2004 | Challener .............. 369/112.27 |
| 2005/0041950 | A1 | 2/2005 | Rottmayer et al. |
| 2005/0052771 | A1 | 3/2005 | Rausch et al. |
| 2005/0078565 | A1 | 4/2005 | Peng et al. |
| 2005/0122850 | A1 | 6/2005 | Challener et al. |
| 2005/0135008 | A1 | 6/2005 | Challener et al. |
| 2005/0289576 | A1 | 12/2005 | Challener |
| 2006/0005216 | A1 | 1/2006 | Rausch |
| 2006/0119983 | A1 | 6/2006 | Rausch et al. |
| 2007/0109919 | A1 | 5/2007 | Yokoyama et al. |
| 2007/0165495 | A1* | 7/2007 | Lee et al. ................. 369/13.33 |
| 2007/0177302 | A1* | 8/2007 | Shimazawa et al. ......... 360/126 |
| 2008/0002298 | A1 | 1/2008 | Sluzewski |
| 2008/0117727 | A1* | 5/2008 | Matsumoto .............. 369/44.14 |
| 2008/0158709 | A1* | 7/2008 | Tanaka et al. ................. 360/59 |
| 2008/0205202 | A1* | 8/2008 | Komura et al. ........... 369/13.02 |
| 2008/0232225 | A1* | 9/2008 | Cho et al. .............. 369/112.27 |
| 2009/0245034 | A1* | 10/2009 | Sekine et al. ............ 369/13.02 |

FOREIGN PATENT DOCUMENTS

| | | |
|---|---|---|
| JP | A-2001-255254 | 9/2001 |
| JP | A-2005-317178 | 11/2005 |
| JP | A-2006-185548 | 7/2006 |

OTHER PUBLICATIONS

Jun. 24, 2010 Office Action issued in U.S. Appl. No. 12/363,010.
Sep. 30, 2010 Office Action issued in U.S. Appl. No. 12/363,010.
U.S. Appl. No. 12/364,765, filed Feb. 3, 2009.
U.S. Appl. No. 12/363,010, filed Jan. 30, 2009.

* cited by examiner

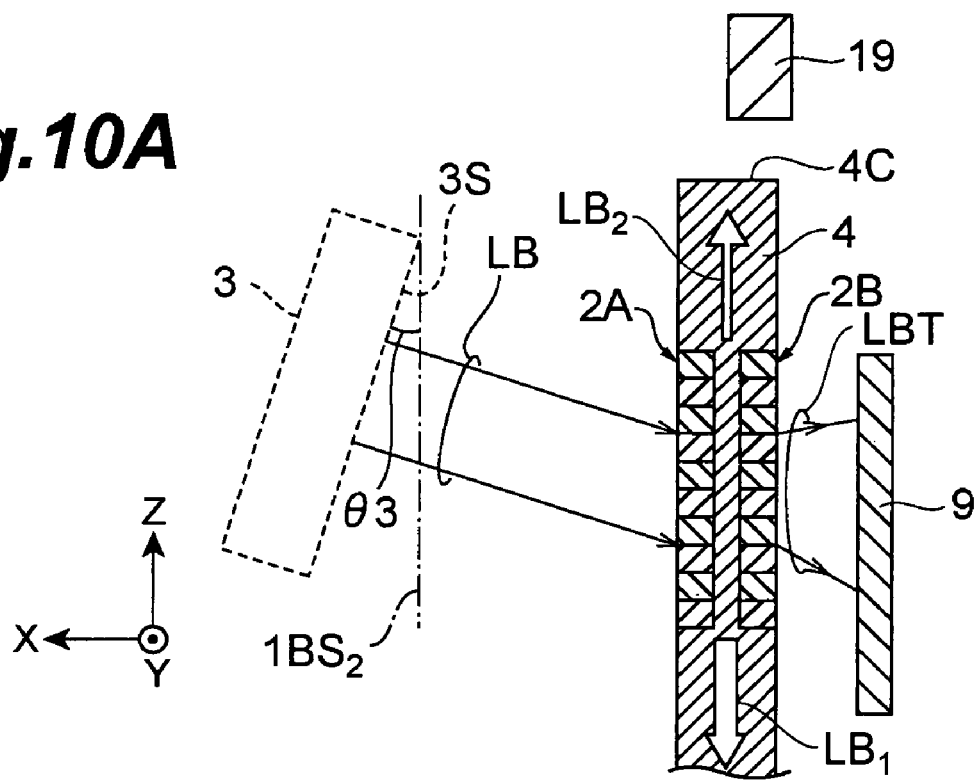
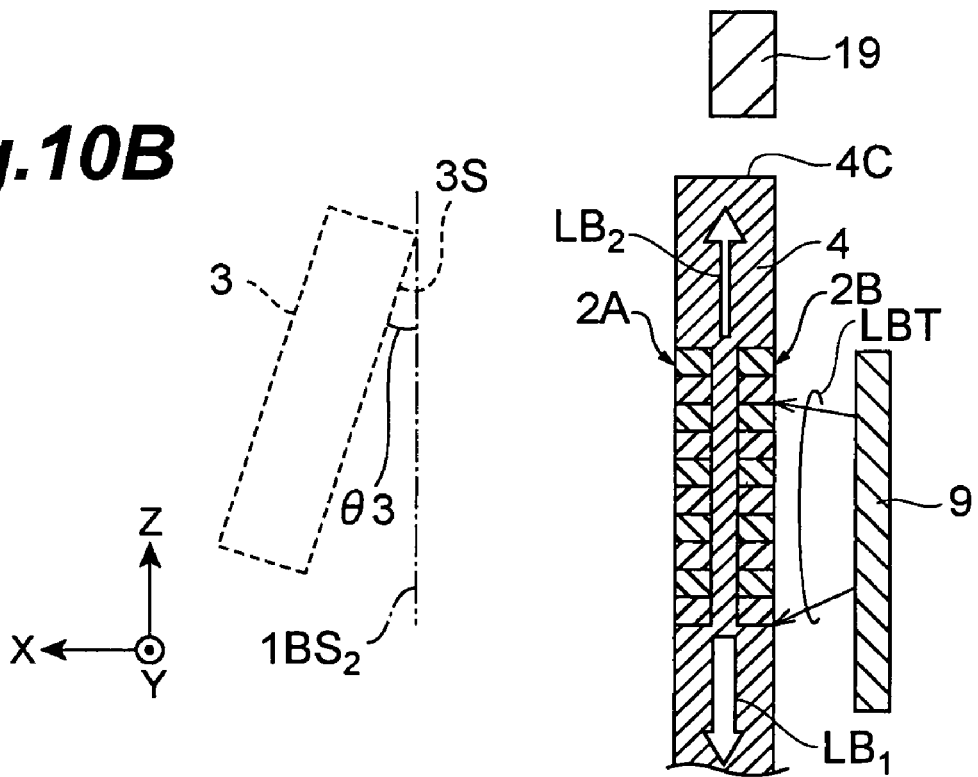

THERMAL-ASSISTED MAGNETIC RECORDING HEAD HAVING SUBSTRATE AND LIGHT REFLECTION SECTION

BACKGROUND OF THE INVENTION

1. Field of the Invention

The present invention relates to a thermally assisted magnetic head having a semiconductor surface-emitting laser.

2. Related Background Art

Thin-film magnetic heads must deliver ever greater performance to cope with higher recording densities in hard disk drives. Widely used thin-film magnetic heads include composite thin-film magnetic heads having a multilayer structure comprising, for instance, a magnetic sensing element such as a magnetoresistive (MR) effect element and an electromagnetic coil element. These elements write and read data signals to/from a magnetic disk, which is a magnetic recording medium.

The magnetic recording medium is normally a so-called discontinuous medium having a structure in which magnetic microparticles are aggregated, each magnetic microparticle constituting a single domain structure. One recording bit comprises a plurality of magnetic microparticles. In order to enhance recording density, therefore, the magnetic microparticles must be made smaller, and the irregularities at the boundaries between recording bits must be reduced. Reducing the size of magnetic microparticles, however, is problematic in that reduction in particle volume is accompanied by a drop in magnetization thermal stability.

The factor $K_U V/k_B T$ is an indicator of magnetization thermal stability. $K_U$ is the magnetic anisotropy energy of the magnetic microparticles, V is the volume of one magnetic microparticle, $k_B$ is the Boltzmann constant, and T is the absolute temperature. Making the magnetic microparticles smaller implies reducing their volume V. In turn, this makes $K_U V/k_B T$ smaller, thereby impairing thermal stability. An approach for addressing this problem is increasing $K_U$ commensurately, but doing so results in a larger coercitivity of the recording medium. In contrast, the strength of the write magnetic field afforded by the magnetic head is largely determined by the saturation flux density of the soft magnetic material that makes up the magnetic poles in the head. Thus, writing may become impossible when the coercitivity exceeds a tolerance that is determined on the basis of the limits of the strength of the write magnetic field.

Proposed methods for solving the problem of magnetization thermal stability include using a magnetic material having a large $K_U$, and resorting to so-called thermally assisted magnetic recording, in which writing is carried out by lowering coercitivity through heating of the recording medium immediately before application of a write magnetic field. Thermally assisted magnetic recording can be broadly classified into magnetic dominant recording and optical dominant recording. In magnetic dominant recording, writing is governed by an electromagnetic coil element, and the radiation diameter of light is larger than the track width (recording width). In optical dominant recording, on the other hand, writing is governed by a light-radiating section, and the radiation diameter of light is approximately equal to the track width (recording width). That is, magnetic field determines the spatial resolution in magnetic dominant recording, whereas light determines the spatial resolution in optical dominant recording.

U.S. Pat. No. 6,944,112 and Japanese Patent Application Laid-open No. 2005-317178 disclose hard disk drives comprising a thermally assisted magnetic head and a light source such as a semiconductor laser or the like. In the hard disk drive disclosed in U.S. Pat. No. 6,944,112, the light source is provided at a position spaced apart from the thermally assisted magnetic head. Emission light from this light source strikes an optical waveguide in the thermally assisted magnetic head, and is led through the optical waveguide to a near-field light generating section provided at a medium-facing surface. The magnetic recording medium is heated by near-field light generated by the near-field light generating section, to carry out thermally assisted magnetic recording.

In the hard disk drive disclosed in Japanese Patent Application Laid-open No. 2005-317178, a semiconductor laser as the light source and the thermally assisted magnetic head are formed integrally as a single unit. Thermally assisted magnetic recording is carried out by heating the magnetic recording medium through direct irradiation thereon of emission light from the light source.

SUMMARY OF THE INVENTION

To manufacture a magnetic head, a plurality of magnetic head portions having magnetic recording elements and the like are ordinarily formed first, for instance in a lattice-like array, on a substrate comprising alutic or the like that yields a slider substrate. Thereafter, the substrate is sliced, to manufacture slider bars in which the magnetic head portions are lined up in a row. One of the sliced surfaces of the substrate yields the medium-facing surface. The medium-facing surface is polished and then the slider bar is sliced to separate individual magnetic head portions from each other, and complete thereby the magnetic heads. Head gimbal assemblies are completed thereafter by combining the magnetic heads with suspensions, and then the head gimbal assemblies are combined with magnetic recording media and the like to complete a hard disk drive.

In a hard disk drive such as the one set forth in U.S. Pat. No. 6,944,112, in which a light source is provided at a position spaced apart from a thermally assisted magnetic head, it is not possible to provide a light source in each magnetic head portion at the stage in which plural magnetic head portions are formed on a substrate in a lattice-like array. Thus, plural magnetic head portions are formed on a substrate, in a lattice-like array, the substrate is sliced to manufacture slide bars, and then the slider bars are further sliced to manufacture thermally assisted magnetic heads. This must be followed by a step of fixing the relative positions of the thermally assisted magnetic heads and the light sources. Therefore, the step of fixing the relative positions of the thermally assisted magnetic heads and the light sources must be performed a number of times equal to the number of thermally assisted magnetic heads to be manufactured, i.e. equal to the number of hard disk drives to be manufactured. Hard disk drives having such thermally assisted magnetic heads have therefore low mass productivity.

In a hard disk drive such as the one disclosed in Japanese Patent Application Laid-open No. 2005-317178, in which a thermally assisted magnetic head and a light source are integrally formed as a single unit and in which emission light from the light source strikes directly a magnetic recording medium, the time that it takes for a write magnetic field to be applied to the magnetic recording medium after heating of the latter is longer than is the case when the emission light from the light source is irradiated onto an optical waveguide of the thermally assisted magnetic head and is led therethrough to a medium-facing surface. Hard disk drives having such thermally assisted magnetic heads are thus not suitable for high recording density.

The intensity of emission light in semiconductor lasers varies normally owing to environment temperature changes, even if the driving current value is kept constant. When semiconductor lasers are used in thermally assisted magnetic heads, such changes in the intensity of emission light caused by environment temperature changes are problematic on account of the associated changes in the intensity of heating of the magnetic recording medium.

However, the hard disk drives having a thermally assisted magnetic head disclosed in U.S. Pat. No. 6,944,112 and Japanese Patent Application Laid-open No. 2005-317178 have no mechanism for keeping constant the intensity of emission light from a semiconductor laser.

The present invention has been accomplished in view of the above problem, and an object of the present invention is to provide a thermally assisted magnetic head, a head gimbal assembly and a hard disk drive that boast high mass productivity, can readily cope with high recording densities, and allow suppressing changes in the intensity of emission light from a semiconductor laser.

The thermally assisted magnetic head according to the present invention comprises a slider having a medium-facing surface and a surface-emitting semiconductor laser, wherein the slider has a slider substrate on which part of the medium-facing surface is formed, and a magnetic head portion, on which another part of the medium-facing surface is formed, and which has a first surface in contact with a head stacking surface of the slider substrate, a second surface opposite the first surface, and a third surface opposite the medium-facing surface, the magnetic head portion comprises a main magnetic pole that generates a write magnetic field from an end face on the side of the medium-facing surface, an optical waveguide core, extending along the first surface, and having a first light exit surface at the medium-facing surface and a second light exit surface at the third surface, a first diffraction grating which is provided in the optical waveguide core or further towards the second surface than the optical waveguide core, and the refractive index of which changes periodically in a direction in which the optical waveguide core extends, and a light reflective section provided further toward the first surface than the optical waveguide core, and wherein the surface-emitting semiconductor laser is provided opposing the second surface in such a manner that emission light therefrom is incident onto the first diffraction grating, the first diffraction grating causing part of emission light from the surface-emitting semiconductor laser to be optically coupled to the optical waveguide core.

In the thermally assisted magnetic head according to the present invention, the second surface that is to oppose the surface-emitting semiconductor laser is exposed at a state in which magnetic head portions are formed on the slider substrate. Therefore, surface-emitting semiconductor lasers corresponding to respective magnetic head portions are collectively caused to face the second surface at a time. In that state, it is possible to collectively fix the relative positions of the magnetic head portions and the surface-emitting semiconductor lasers at a time. The thermally assisted magnetic head according to the present invention does not comprise an end surface-emitting semiconductor laser, but a surface-emitting semiconductor laser. In an end surface-emitting semiconductor laser, emission light is emitted in a direction parallel to the main plane of the semiconductor substrate, from an end surface formed by cleaving the semiconductor substrate at a plane perpendicular to the main plane of the semiconductor substrate. By contrast, a surface-emitting semiconductor laser outputs emission light in a direction perpendicular to the main plane of the semiconductor substrate. As a result, the area of the light exit surface of the surface-emitting semiconductor laser is larger than the area of the light exit surface of an end surface-emitting semiconductor laser. In the thermally assisted magnetic head according to the present invention, as a result, the second surface stands opposite the light exit surface, which has a larger area than the light exit surface of an end surface-emitting semiconductor laser, when the surface-emitting semiconductor laser is provided in such a manner that the emission light is incident on the first diffraction grating. This allows fixing the relative positions of the magnetic head portions and the surface-emitting semiconductor lasers more easily than when using end surface-emitting semiconductor lasers. The thermally assisted magnetic head according to the present invention boasts as a result higher mass productivity.

In the thermally assisted magnetic head according to the present invention, moreover, at least part of the emission light from the surface-emitting semiconductor laser is coupled to the optical waveguide core in the magnetic head portion by way of the first diffraction grating. Therefore, at least part of the emission light from the surface-emitting semiconductor laser can be outputted through the first light exit surface of the medium-facing surface of the magnetic head portion. As a result, the time elapsed since heating of the magnetic recording medium until application of a write magnetic field to the magnetic recording medium can be shortened vis-á-vis the time elapsed in thermally assisted magnetic heads where emission light from a light source is irradiated directly onto the magnetic recording medium. The thermally assisted magnetic head can readily cope thereby with high recording densities.

In the thermally assisted magnetic head according to the present invention, moreover, at least part of the emission light from the surface-emitting semiconductor laser reflected by the light reflective section is incident on the optical waveguide core, such that part of that incident light propagates through the optical waveguide core and exits through the second light exit surface. The intensity of the light exiting through the second light exit surface is proportional to the intensity of the emission light from the surface-emitting semiconductor laser. Therefore, the intensity of the emission light from the surface-emitting semiconductor laser can be calculated on the basis of the intensity of the light that exits through the second light exit surface. As a result, the driving current value in the surface-emitting semiconductor laser can be regulated in such a way so as to keep the intensity of the emission light constant, which allows suppressing intensity changes in the emission light from the surface-emitting semiconductor laser.

Thus, the thermally assisted magnetic head according to the present invention boasts high mass productivity, can readily cope with high recording densities, and allows suppressing changes in the intensity of emission light from a semiconductor laser.

Preferably, the thermally assisted magnetic head according to the present invention further comprises a light intensity measuring section that receives light exiting through the second light exit surface. The intensity of the light exiting through the second light exit surface can be measured by way of the light intensity measuring section.

In the thermally assisted magnetic head according to the present invention, the surface-emitting semiconductor laser is preferably a photonic crystal surface-emitting semiconductor laser. Emission light outputted from a photonic crystal surface-emitting semiconductor laser has a larger spot size and narrower divergence angle than that of a surface-emitting semiconductor laser comprising no photonic crystal. The optical coupling efficiency between the emission light of a photonic crystal semiconductor laser and the optical waveguide core, via the first diffraction grating, increases thereby. The magnetic recording medium can be heated as a result to a higher temperature, which affords in turn a thermally assisted magnetic head capable of coping with higher recording densities.

Preferably, the magnetic head portion further comprises a second diffraction grating provided in the optical waveguide core, further toward the first surface than the first diffraction grating, or provided between the optical waveguide core and the light reflective section, the refractive index of the second diffraction grating changing periodically in the direction in which the optical waveguide core extends.

The second diffraction grating increases thereby the optical coupling efficiency of the reflected light, resulting from reflection of the emission light from the surface-emitting semiconductor laser at the light reflective section, to the optical waveguide core. The intensity of the light exiting through the second light exit surface becomes stronger thereby, and hence the intensity of the emission light from the surface-emitting semiconductor laser can be calculated more accurately.

Preferably, the position of the surface-emitting semiconductor laser relative to the slider is fixed in such a manner that a plane parallel to a light exit surface of the surface-emitting semiconductor laser intersects the second surface of the magnetic head portion at an acute angle, and in such a manner that emission light of the surface-emitting semiconductor laser has, immediately after being emitted, a component in a direction from the second light exit surface towards the first light exit surface of the optical waveguide core.

This allows increasing the proportion of emission light, from among the emission light of the surface-emitting semiconductor laser, that becomes coupled to the optical waveguide core via the first diffraction grating and that propagates towards the first light exit surface. The magnetic recording medium can be heated as a result to a higher temperature, which affords in turn a thermally assisted magnetic head capable of coping with higher recording densities.

Preferably, the thermally assisted magnetic head further comprises in this case a UV-curable resin provided between the surface-emitting semiconductor laser and the second surface of the magnetic head portion. The surface-emitting semiconductor laser can be provided stably thereby on the second surface.

The head gimbal assembly according to the present invention comprises the above-described thermally assisted magnetic head and a suspension onto which the thermally assisted magnetic head is mounted.

Since the head gimbal assembly according to the present invention comprises the above-described thermally assisted magnetic head, the head gimbal assembly according to the present invention boasts high mass productivity, can readily cope with high recording densities, and allows suppressing changes in the intensity of emission light from a semiconductor laser.

The hard disk drive according to the present invention comprises the above-described head gimbal assembly and a magnetic recording medium facing the medium-facing surface.

Since the hard disk drive according to the present invention comprises the above-described thermally assisted magnetic head, the hard disk drive according to the present invention boasts high mass productivity, can readily cope with high recording densities, and allows suppressing changes in the intensity of emission light from a semiconductor laser.

The present invention provides thus a thermally assisted magnetic head, a head gimbal assembly and a hard disk drive that boast high mass productivity, can readily cope with high recording densities, and allow suppressing changes in the intensity of emission light from a semiconductor laser.

BRIEF DESCRIPTION OF THE DRAWINGS

FIG. 10A is a schematic diagram illustrating a relationship between a surface-emitting semiconductor laser, a first diffraction grating, a second diffraction grating and an optical waveguide core;

FIG. 10B is a schematic diagram illustrating a relationship between a surface-emitting semiconductor laser, a first diffraction grating, a second diffraction grating and an optical waveguide core;

DESCRIPTION OF THE PREFERRED EMBODIMENTS

Figure 1:
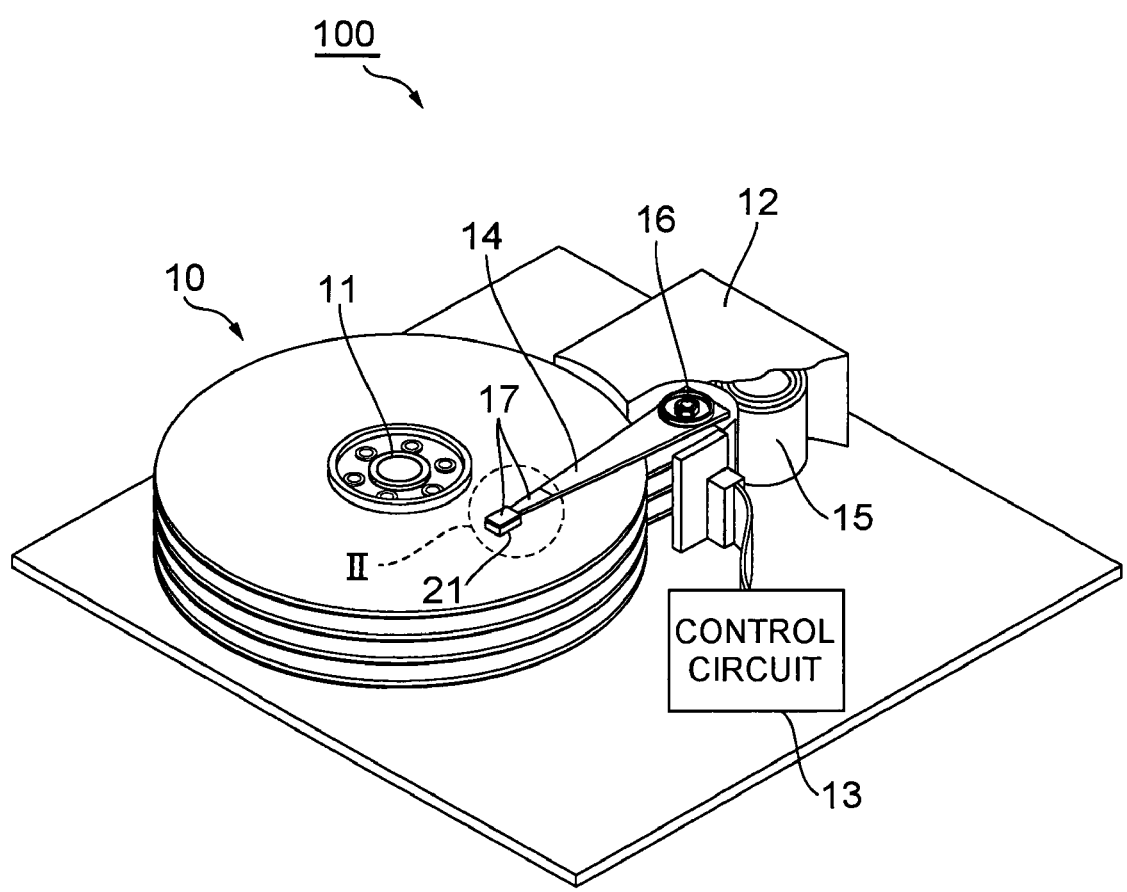
FIG. 1 is a perspective-view diagram of a hard disk drive according to an embodiment.

Embodiments of the thermally assisted magnetic head, the head gimbal assembly and the hard disk drive are explained in detail next with reference to accompanying drawings. Wherever possible, identical elements are denoted with identical reference numerals.

FIG. 1 is a perspective-view diagram of a hard disk drive according to an embodiment.

The hard disk drive 100 comprises magnetic disks 10, as a plurality of magnetic recording media that rotate around a rotation shaft of a spindle motor 11; an assembly carriage device 12 for positioning each thermally assisted magnetic head 21 on a track; and a recording, reproduction, and emission control circuit (control circuit) 13 for controlling writing and reading operations of the thermally assisted magnetic head 21, and for controlling a laser diode, as a light source that emits a laser beam, for performing thermally assisted magnetic recording, as described in detail below.

The assembly carriage device 12 is provided with a plurality of drive arms 14. These drive arms 14 are rockable around a pivot bearing shaft 16 by a voice coil motor (VCM) 15, and are stacked in the direction along this shaft 16. A head gimbal assembly (HGA) 17 is attached to the leading end of each drive arm 14. Each HGA 17 is provided with a thermally assisted magnetic head 21 in such a manner that the latter faces the surface of each magnetic disk 10. The surface of the magnetic head 21 facing the surface of the magnetic disk 10 is a medium-facing surface S (also called an air bearing surface) of the thermally assisted magnetic head 21. The magnetic disks 10, drive arms 14, HGAs 17, and thermally assisted magnetic heads 21 may each be provided singly.

Figure 2:
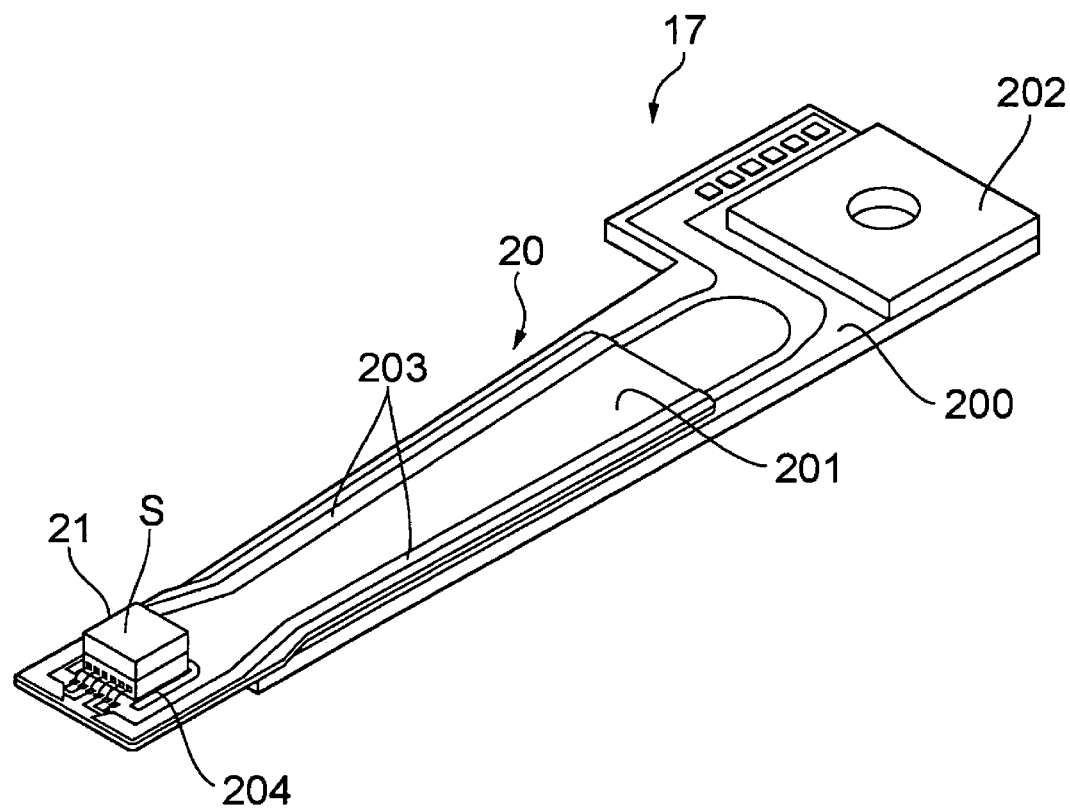
FIG. 2 is a perspective-view diagram of an HGA.

FIG. 2 is a perspective-view diagram of an HGA. In the figure, the medium-facing surface S of the HGA 17 is depicted facing upwards.

The HGA 17 is constructed by fixing the thermally assisted magnetic head 21 to a leading end of a suspension 20 and by electrically connecting one end of a wiring member 203 to terminal electrodes of the thermally assisted magnetic head 21. The suspension 20 comprises mainly a load beam 200, an elastic flexure 201 fixed and supported on the load beam 200, a tongue portion 204 formed in a plate spring shape at the tip of the flexure, a base plate 202 provided on the base of the load beam 200, and a wiring member 203 provided on the flexure 201 and comprising a lead conductor and connection pads electrically connected to both ends of the lead conductor.

It is obvious that the structure of the suspension in the HGA 17 of the present invention is not limited to the above-described structure. Although not shown in the figure, an IC chip for head driving may be mounted midway in the suspension 20.

The thermally assisted magnetic head according to an embodiment is explained next.

Figure 3:
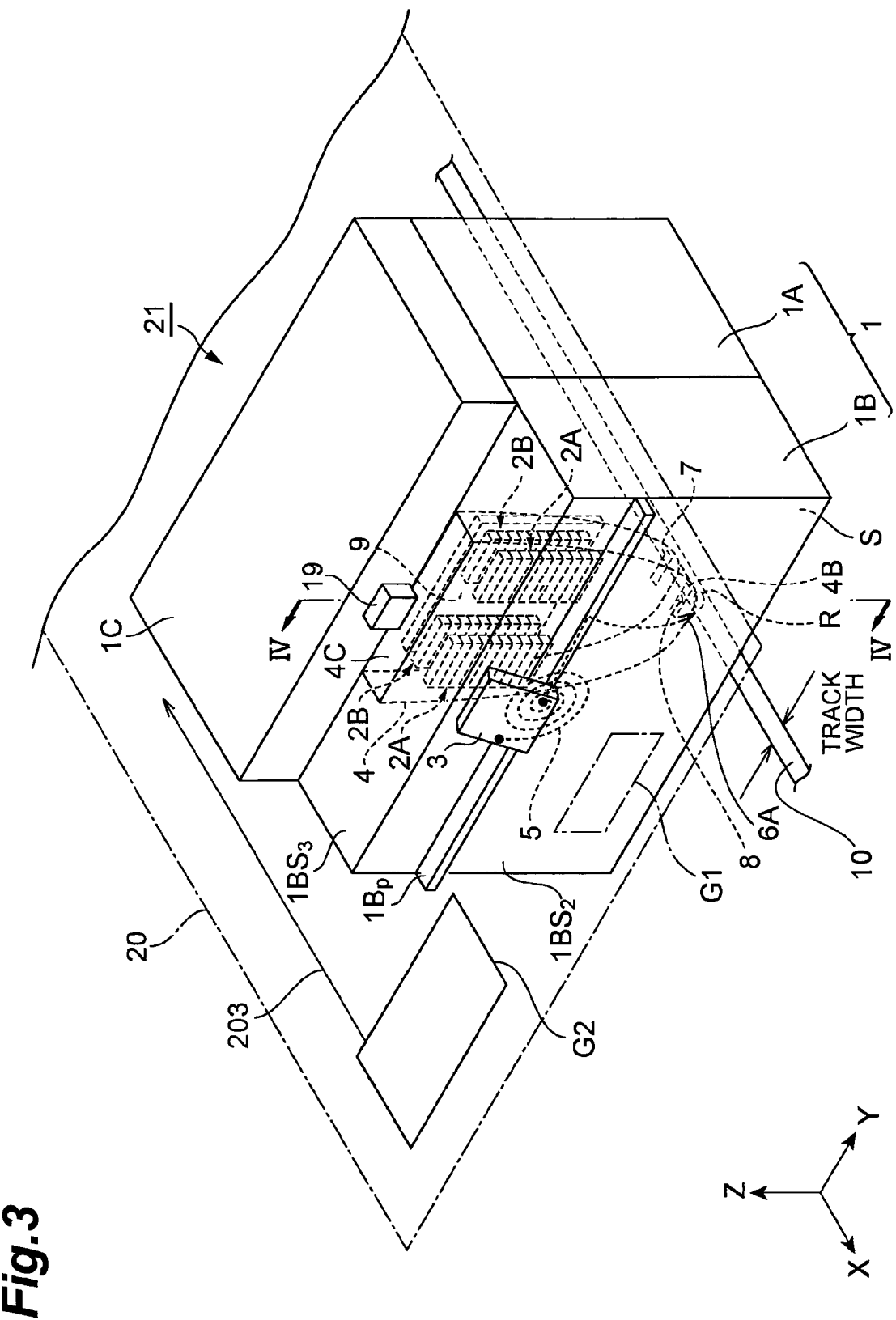
FIG. 3 is an enlarged perspective-view diagram of the vicinity of a thermally assisted magnetic head of the HGA illustrated in FIG. 2.
Figure 4:
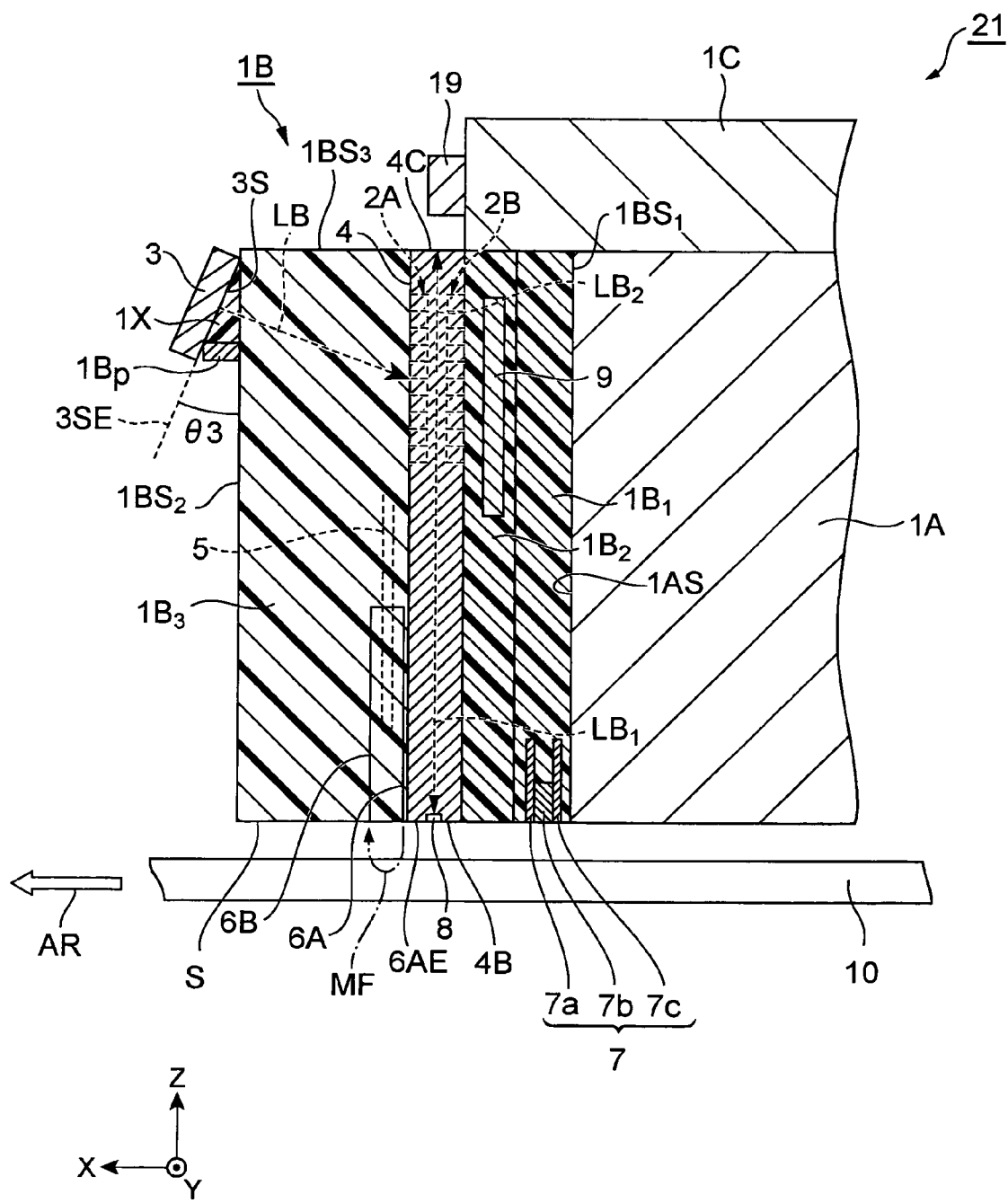
FIG. 4 is a cross-sectional diagram of the thermally assisted magnetic head of FIG. 3 along a line IV-IV.
Figure 5:
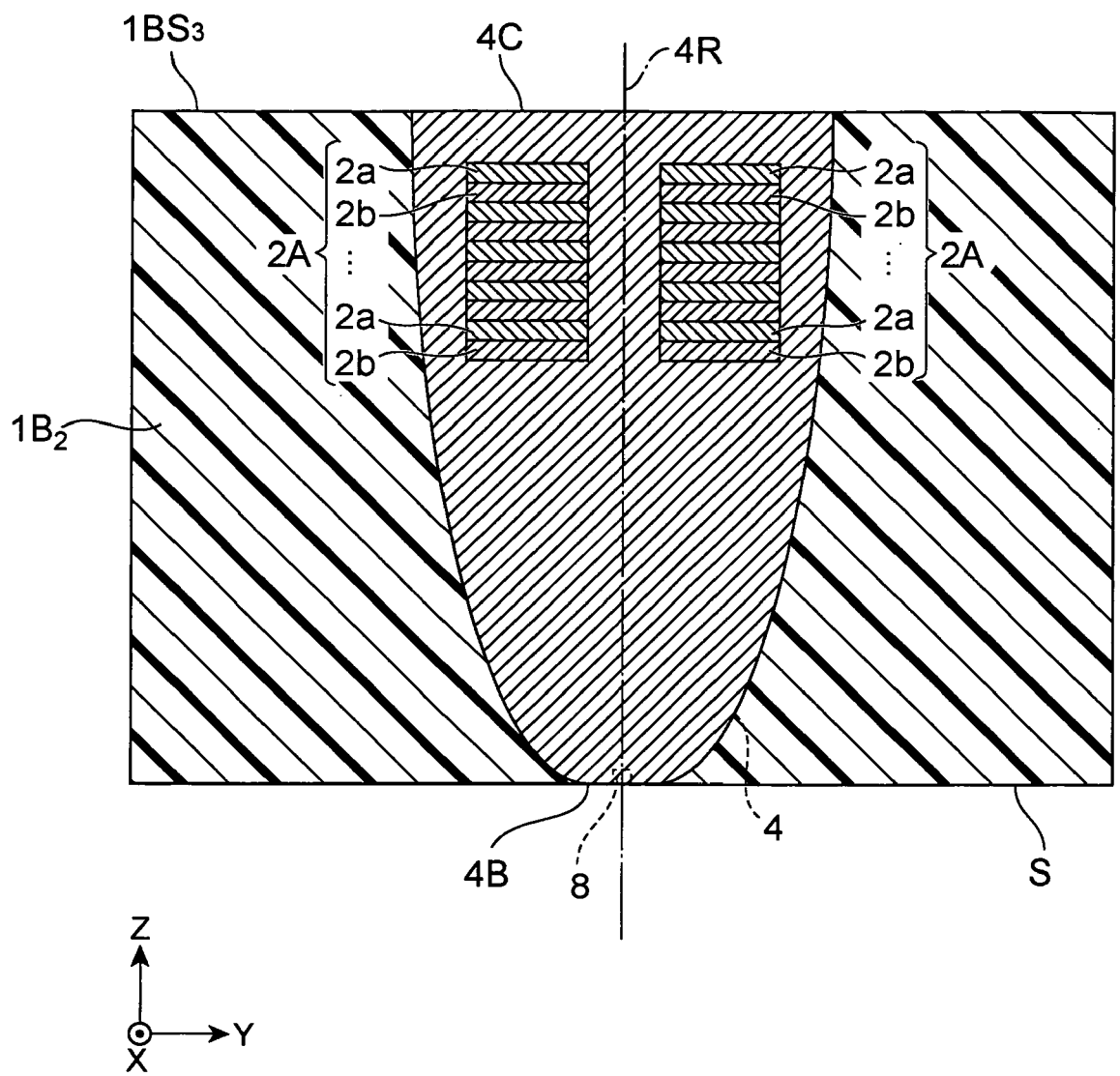
FIG. 5 is a cross-sectional diagram of an optical waveguide core of the thermally assisted magnetic head.

FIG. 3 is an enlarged perspective-view diagram of the vicinity of a thermally assisted magnetic head of the HGA illustrated in FIG. 2. FIG. 4 is a cross-sectional diagram of the thermally assisted magnetic head of FIG. 3 along the line IV-IV. In FIGS. 3 and 4 there is depicted an orthogonal coordinate system in which the track width direction is set to the Y-axis direction, while the direction perpendicular to the Y-axis and parallel to the medium-facing surface is set to the X-axis. The X-axis positive direction is set to the trailing direction (downstream in the direction along which the magnetic recording medium moves relative to the magnetic head), while the X-axis negative direction is set to the leading side (upstream in the direction along which the magnetic recording medium moves relative to the magnetic head). FIG. 5 and so forth depict also an orthogonal coordinate system corresponding to that of FIGS. 3 and 4.

As illustrated in FIG. 3, the thermally assisted magnetic head 21 is mounted on the leading end of the suspension 20. As illustrated in FIGS. 3 and 4, the thermally assisted magnetic head 21 comprises a slider 1, a surface-emitting semiconductor laser 3, a photodiode 19 as a light intensity measuring section, and a support member IC.

The XY plane of the slider 1 in the Z-axis negative direction constitutes a medium-facing surface S. The slider 1 comprises a slider substrate 1A on which a part of the medium-facing surface S is formed, and a magnetic head portion 1B on which another part of the medium-facing surface S is formed. The slider substrate 1A comprises, for instance, alutic ($Al_2O_3$—TiC).

As illustrated in FIG. 4, the magnetic head portion 1B has a first surface $1BS_1$ and a second surface $1BS_2$ opposite the first surface $1BS_1$. The first surface $1BS_1$ of the magnetic head portion 1B is in contact with the YZ plane of the slider substrate 1A in the X-axis positive direction, i.e. in contact with a head stacking surface 1AS that is perpendicular to the medium-facing surface S. The head stacking surface 1AS is a surface of the slider substrate 1A on which the magnetic head portion 1B is formed. In the present embodiment, the first surface $1BS_1$ and the second surface $1BS_2$ of the magnetic head portion 1B are both parallel to the YZ plane, but may also intersect the YZ plane at an acute angle. In the present embodiment, moreover, the head stacking surface 1AS is parallel to the second surface $1BS_2$.

The magnetic head portion 1B comprises a plurality of elements embedded in an insulator. Each of these elements comprises a spiral coil 5 for generating a magnetic field for information writing when current is supplied to the coil; a main magnetic pole 6A extending from the center of the coil, for guiding the magnetic flux generated by the coil 5 up to the medium-facing surface S; a magnetoresistive effect element (MR element) 7 having a magnetoresponsive surface exposed at the medium-facing surface S; a core 4 of an optical waveguide extending in the Z-axis direction, and surrounded with an insulator as a cladding; first diffraction gratings 2A; second diffraction gratings 2B; and a light reflective section 9. The magnetic head portion 1B is obtained by stacking these elements along the X-axis direction. The stacking direction runs along the array direction of the recording region R within a track, the track width being parallel to the Y-axis.

The MR element 7 is embedded in a lower insulator layer $1B_1$ provided on the head stacking surface 1AS of the slider substrate 1A. The lower insulator layer $1B_1$ comprises, for instance, alumina ($Al_2O_3$). The MR element 7 comprises an upper shield electrode 7a, a lower shield electrode 7c and a magnetoresistive effect layer 7b interposed between the upper shield electrode 7a and the lower shield electrode 7c. The magnetoresistive effect layer 7b is a multilayer film that elicits a magnetoresistive effect, for instance a tunnel magnetoresistive effect layer obtained by stacking a magnetization free layer and a ferromagnetic layer via a tunnel barrier layer, or a giant magnetoresistive effect layer obtained by stacking a magnetization free layer and a ferromagnetic layer via a non-magnetic metal layer.

The main magnetic pole 6A is embedded in an overcoat layer $1B_3$, comprising an insulator, that is provided more in the X-axis positive direction than the lower insulator layer $1B_1$. The overcoat layer $1B_3$ comprises, for instance, alumina ($Al_2O_3$). The main magnetic pole 6A extends along the Z-axis direction, with an end face 6AE of the main magnetic pole 6A being exposed at the medium-facing surface S. The main magnetic pole 6A comprises a ferromagnetic material, specifically an alloy of two or three among Ni, Fe and Co, or an alloy having the foregoing as a main component and having added thereto a predetermined element.

When current is fed to the coil 5, the latter generates a magnetic field for information writing. The main magnetic pole 6A guides this magnetic field for information writing to the end face 6AE, which applies the magnetic field for information writing towards the recording region R at the surface of the magnetic disk 10. An auxiliary magnetic pole 6B comprising a ferromagnetic material may be optionally provided close to the main magnetic pole 6A, but separated from the latter, in the X-axis positive or negative direction, such that magnetic field lines (magnetic flux) MF from the main magnetic pole 6A flow into the auxiliary magnetic pole 6B via the recording region R. The main magnetic pole 6A need not be exposed at the medium-facing surface S, as long as the main magnetic pole 6A is positioned in such a manner so as to be capable of applying a write magnetic field from the end face 6AE on the side of the medium-facing surface S towards the recording region R on the surface of the magnetic disk 10.

An optical waveguide core 4 is provided between the lower insulator layer $1B_1$ and the overcoat layer $1B_3$, extending in the Z-axis direction along the first surface $1BS_1$ of the magnetic head portion 1B. The optical waveguide core 4 has a first light exit surface 4B at the medium-facing surface S and a second light exit surface 4C at a third surface $1BS_3$.

In the present embodiment, the first diffraction gratings 2A and the second diffraction gratings 2B are provided in the optical waveguide core 4. The first diffraction gratings 2A are in contact with the YZ plane of the optical waveguide core 4 in the X-axis positive direction, while the second diffraction gratings 2B are in contact with the YZ plane of the optical waveguide core 4 in the X-axis negative direction.

The light reflective section 9 is embedded in the insulator layer $1B_2$, further toward the first surface $1BS_1$ than the optical waveguide core 4. The light reflective section 9 is, for instance, a plate-like member the thickness direction of which is the X-axis direction. The light reflective section 9 comprises, for instance, a metal. Examples of the material that makes up the light reflective section 9 include, for instance, gold (Au), silver (Ag), aluminum (Al) and platinum (Pt). The light reflective section 9 has the function of reflecting light that is incident thereon. The thickness of the light reflective section 9 in the X-axis direction is, for instance, 0.1 to 10 μm, the height in the Z-axis direction is, for instance, 20 to 150 μm, and the width in the Y-axis direction is, for instance, 20 to 150 μm.

Figure 6:
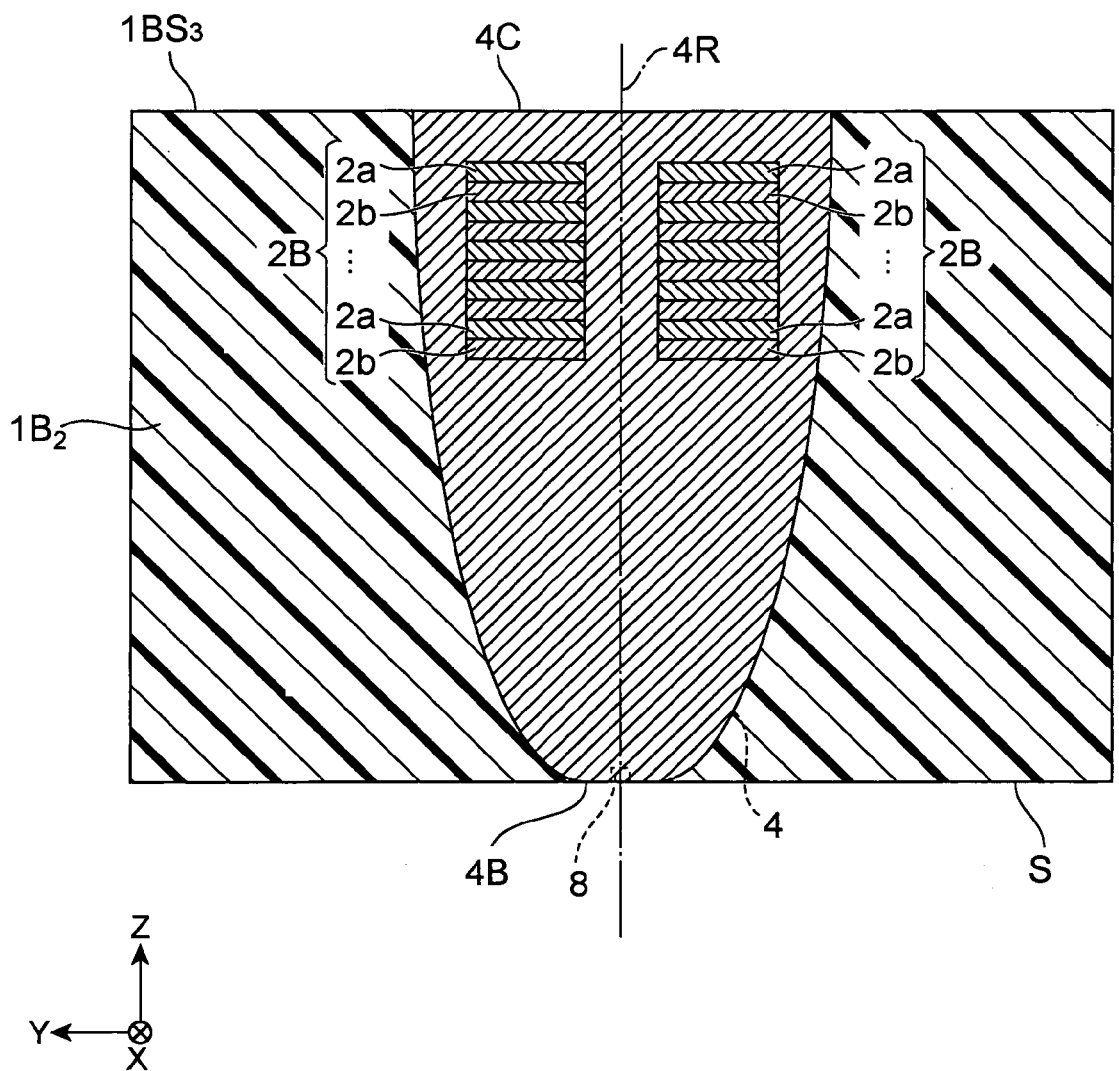
FIG. 6 is a cross-sectional diagram of an optical waveguide core of the thermally assisted magnetic head.

The optical waveguide core 4, the first diffraction gratings 2A and the second diffraction gratings 2B are explained in detail next. FIG. 5 is a cross-sectional diagram of the first diffraction gratings of the thermally assisted magnetic head; and FIG. 6 is a cross-sectional diagram of the second diffraction gratings of the thermally assisted magnetic head. As illustrated in FIGS. 4 to 6, the periphery of the optical waveguide core 4 is surrounded by an insulator. Specifically, the surface of the optical waveguide core 4 on the negative side of the X-axis, and both side faces in the Y-axis direction are surrounded by an insulator layer $1B_2$, while the surface of the optical waveguide core 4 on the positive side of the X-axis is surrounded by the overcoat layer $1B_3$. The optical waveguide core 4 comprises an insulator having a higher refractive index than that of the insulator layer $1B_2$ and the overcoat layer $1B_3$. As described below, emission light LB from the surface-emitting semiconductor laser 3 propagates through the overcoat layer $1B_3$. Therefore, the overcoat layer $1B_3$ comprises a material having high enough transmittance towards the emission light LB. When A denotes the material of the optical waveguide core 4 and B denotes the material of the insulator layer $1B_2$ and the overcoat layer $1B_3$, combinations of A and B (A, B) include, for instance, (tantalum oxide ($TaO_x$), alumina ($Al_2O_3$)), (titanium oxide (TiOx), alumina ($Al_2O_3$)) and (silicon nitride (SiN), alumina ($Al_2O_3$)). The materials of the insulator layer $1B_2$ and the overcoat layer $1B_3$ may be dissimilar.

As illustrated in FIGS. 4 and 5, the optical waveguide core 4 is shaped as a plate the thickness direction of which coincides with the X-axis direction. As viewed from the X-axis direction, the optical waveguide core 4 has a symmetry axis 4R parallel to the Z-axis, and is shaped as a parabola whose apex lies beyond the medium-facing surface S, with the vicinity of the apex being cut off parallelly to the XY plane. The cutting plane parallel to the XY plane in the vicinity of the apex of the optical waveguide core 4 yields the first light exit surface 4B. A plasmon antenna 8, as a near-field light generating section, is provided at the first light exit surface 4B. The plasmon antenna 8 comprises a metal. Preferably, the plasmon antenna 8 is disposed at or near the focus of the parabolic shape of the optical waveguide core 4. The surface opposite the first light exit surface 4B of the optical waveguide core 4 is the second light exit surface 4C.

The thickness of the optical waveguide core 4 in the X-axis direction is, for instance 0.2 to 4.0 μm. The length of the first light exit surface 4B in the Y-axis direction is, for instance, 0.5 to 10 μm, and the length of the second light exit surface 4C in the Y-axis direction is, for instance, 10 to 100 μm.

The photodiode 19 is provided opposite the second light exit surface 4C. Specifically, the plate-like support member 1C is provided, for instance, at the XY plane of the slider substrate 1A, in the Z-axis positive direction, and the photodiode 19 is fixed to the YZ plane of the support member 1C in the X-axis positive direction, in such a manner so as to oppose the second light exit surface 4C.

A pair of first diffraction gratings 2A is provided in the optical waveguide core 4, the gratings being spaced apart from each other symmetrically relative to the symmetry axis 4R of the optical waveguide core 4, as illustrated in FIG. 5. Each grating of the pair of first diffraction gratings 2A is a stack of multiple layers of a high-refractive index layer 2a, comprising a high-refractive index insulator, and a low-refractive index layer 2b, comprising a low-refractive index insulator, that are alternatively stacked along the Z-axis direction. As a result, the refractive index of the pair of first diffraction gratings 2A changes periodically in the Z-axis direction. Combinations (C, D), wherein C denotes the material of the high-refractive index layer 2a and D denotes the material of the low-refractive index layer 2b include, for instance, (tantalum oxide ($TaO_x$), alumina ($Al_2O_3$)), (silicon nitride (SiN), alumina ($Al_2O_3$) and (tantalum oxide ($TaO_x$), silicon oxide ($SiO_x$)). The high-refractive index layer 2a or the low-refractive index layer 2b may comprise the same material as the optical waveguide core 4.

The thickness of each first diffraction grating 2A in the X-axis direction is, for instance, 0.4 to 5.0 μm, the length in the Z-axis direction is, for instance, 0.3 to 2.0 μm, and the width in the Y-axis direction is, for instance, 1.0 to 100 μm. As described below, the lengths of the high-refractive index layer 2a and of the low-refractive index layer 2b in the Z-axis direction have a value close to the wavelength of the emission light LB, and range for instance from 400 to 1600 nm.

As shown in FIG. 6, each grating of the pair of second diffraction gratings 2B is a stack of multiple layers of a high-refractive index layer 2a, comprising a high-refractive index insulator, and a low-refractive index layer 2b, comprising a low-refractive index insulator, that are alternatively stacked along the Z-axis direction. The constitution of the pair of second diffraction gratings 2B is identical to that of the first diffraction gratings 2A (FIG. 5). That is, the pair of second diffraction gratings 2B is equivalent to a pair of first diffraction gratings 2A displaced in the X-axis negative direction (FIG. 4). Therefore, the pair of second diffraction gratings 2B is provided in the optical waveguide core 4 further towards the first surface $1BS_1$ than the pair of first diffraction gratings 2A. The thickness of the second diffraction gratings 2B in the X-axis direction, the length in the Z-axis direction and the width in the Y-axis direction may each be different from the thickness in the X-axis direction, the length in the Z-axis direction and the width in the Y-axis direction of the first diffraction gratings 2A.

As illustrated in FIGS. 3 and 4, the position of the surface-emitting semiconductor laser 3 relative to the second surface $1BS_2$ is fixed, with the surface-emitting semiconductor laser 3 slanting opposite the second surface $1BS_2$ in such a manner that a straight line extending in the propagation direction of the emission light LB intersects the second surface $1BS_2$. The surface-emitting semiconductor laser 3 is also provided in such a manner so as to oppose the first diffraction gratings 2A and the light reflective section 9, i.e. in such a manner that a straight line extending in the propagation direction of the emission light LB intersects the first diffraction gratings 2A and the light reflective section 9.

On the second surface $1BS_2$ there is formed a protrusion $1B_p$ protruding in the X-axis positive direction and extending in the Y-axis direction. The surface-emitting semiconductor laser 3 is provided at the second surface $1BS_2$ in such a manner that a light exit surface 3S of the surface-emitting semiconductor laser 3 is in contact with the second surface $1BS_2$ and the protrusion $1B_p$. A hypothetical plane 3SE parallel to the light exit surface 3S intersects the second surface $1BS_2$ at an acute angle $\theta 3$. Therefore, the emission light LB from the surface-emitting semiconductor laser 3 has a component not only in the X-axis negative direction, but also a component in the Z-axis negative direction.

Preferably, a UV-curable resin 1X is provided between the light exit surface 3S and the second surface $1BS_2$. The relative positions of the surface-emitting semiconductor laser 3 and the second surface $1BS_2$ become fixed stably thereby. Preferably, the UV-curable resin 1X comprises a material having a lower permittivity than that of the overcoat layer $1B_3$, in order to make the emission light LB unlikelier to be reflected at the interface of the UV-curable resin 1X and the overcoat layer $1B_3$, i.e. at the second surface $1BS_2$.

As illustrated in FIG. 4, the emission light LB propagates through the overcoat layer $1B_3$ and strikes the first diffraction gratings 2A. The first diffraction gratings 2A optically couple at least part of the emission light LB, which is incident on the first diffraction gratings 2A, to the optical waveguide core 4. Part of the emission light LB travels as a first propagation beam $LB_1$ through the optical waveguide core 4, in the Z-axis negative direction, while another part of the emission light LB travels as a second propagation beam $LB_2$ through the optical waveguide core 4, in the Z-axis positive direction.

Yet another part of the emission light LB passes through the first diffraction gratings 2A, the optical waveguide core 4 and the second diffraction gratings 2B, strikes the light reflective section 9 and is reflected thereon. At least part of the light reflected by the light reflective section 9 becomes incident on the second diffraction gratings 2B. As is the case in the first diffraction gratings 2A, the second diffraction gratings 2B optically couple at least part of the light incident thereon to the optical waveguide core 4. Therefore, part of the light reflected by the light reflective section 9 travels, as the first propagation beam $LB_1$ through the optical waveguide core 4, in the Z-axis negative direction, while another part of the emission light LB travels, as the second propagation beam $LB_2$ through the optical waveguide core 4, in the Z-axis negative direction.

The second propagation beam $LB_2$ exits through the second light exit surface 4C and strikes the photodiode 19. The intensity of the second propagation beam $LB_2$ can be measured by way of the photodiode 19.

At least part of the first propagation beam $LB_1$ strikes the plasmon antenna 8. When the plasmon antenna 8 is disposed at or near the focus of the parabolic shape of the optical waveguide core 4, the first propagation beam $LB_1$ propagates towards the plasmon antenna 8 by propagating through the optical waveguide core 4 parallelly to the Z-axis negative direction and by being totally reflected at the interface between the optical waveguide core 4 and the insulator layer $1B_2$. The first propagation beam $LB_1$ strikes thereby the plasmon antenna 8 with good efficiency.

The plasmon antenna 8 resonates with the incident first propagation beam $LB_1$ and generates near-field light that in turn heats the recording region R. The end face 6AE of the main magnetic pole 6A is positioned near the plasmon antenna 8. When the recording region R of the magnetic recording medium is heated by near-field light generated by the plasmon antenna 8, the recording magnetic field from the main magnetic pole 6A can be applied to the recording region R before the latter reverts to its original temperature.

The plasmon antenna 8 is explained in detail next.

Figure 7:
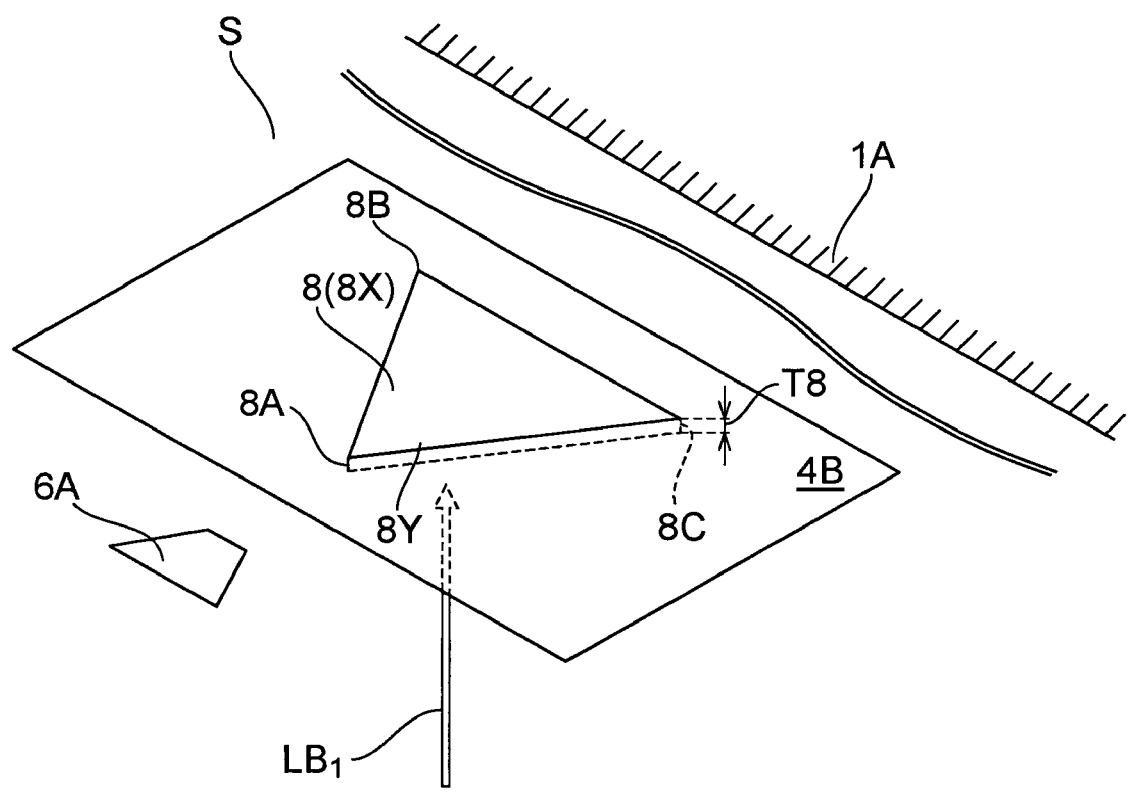
FIG. 7 is a perspective-view diagram of a medium-facing surface in the vicinity of a plasmon antenna.
Figure 8:
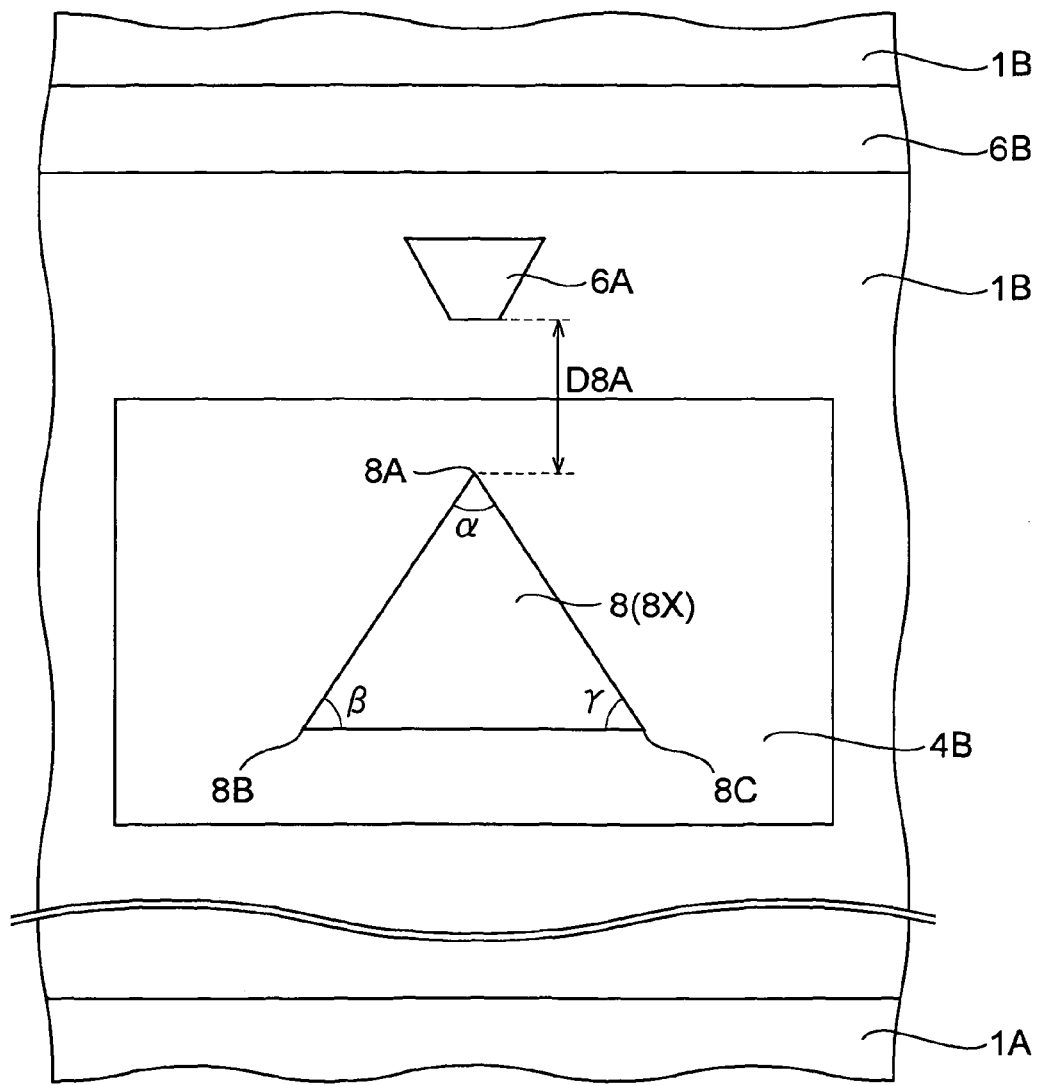
FIG. 8 is a plan-view diagram of a medium-facing surface in the vicinity of a plasmon antenna.

FIG. 7 is a perspective-view diagram of a medium-facing surface in the vicinity of a plasmon antenna; and FIG. 8 is a plan-view diagram of a medium-facing surface in the vicinity of a plasmon antenna.

As illustrated in FIGS. 7 and 8, the plasmon antenna 8 is provided on the first light exit surface 4B. The plasmon antenna 8 is shaped, for instance, as a triangular plate having a first vertex 8A, a second vertex 8B and a third vertex 8C. More specifically, the plasmon antenna 8 is formed, on the XY plane of the medium-facing surface S, as a triangular plate the thickness of which extends in the Z-axis direction. Therefore, the plasmon antenna 8 has a front face 8X parallel to the medium-facing surface S, and side faces 8Y that define the thickness of the plasmon antenna 8 in the Z-axis direction.

As illustrated in FIG. 8, the plasmon antenna 8 is provided further in the X-axis negative direction than the main magnetic pole 6A. The first vertex 8A and the main magnetic pole 6A face each other across a short distance on the medium-facing surface S. The distance D8A from the main magnetic pole 6A to the first vertex 8A, which is the vertex closest to the main magnetic pole 6A, is for instance 0.01 to 0.2 µm.

As illustrated in FIG. 7, the thickness T8 of the plasmon antenna 8 is, for instance, 0.01 to 0.2 µm. The length of the side S8AB from vertex A to vertex B of the plasmon antenna 8 is, for instance, 0.01 to 0.5 µm. The length of the side S8BC from vertex B to vertex C is, for instance, 0.01 to 0.5 µm. The length of the side S8AC from vertex A to vertex C is, for instance, 0.01 to 0.5 µm.

When the first propagation beam $LB_1$ strikes this plasmon antenna 8, charges concentrate in the latter. Thereupon, the plasmon antenna 8 emits near-field light towards the magnetic recording medium. This charge concentration is likely to be strongest in the vicinity of the vertex that has the smallest interior angle among the vertices of the plasmon antenna 8. Therefore, the interior angle α of the first vertex 8A is preferably smaller than the interior angle β of the second vertex 8B and the interior angle γ of the third vertex 8C. This allows shortening, as a result, the time that it takes for magnetic field lines MF from the main magnetic pole 6A to reach the recording region R of the magnetic recording medium, after heating thereof.

In the present embodiment, the plasmon antenna 8 is provided further in the X-axis negative direction, i.e. further towards the leading side, than the main magnetic pole 6A. This allows shortening, as a result, the time that it takes for magnetic field lines MF from the main magnetic pole 6A to reach the recording region R of the magnetic recording medium, after heating thereof.

Materials that can be used as the material making up the plasmon antenna 8 include, for instance, metals such as gold (Au), silver (Ag), copper (Cu), iridium (Ir), magnesium (Mg), platinum (Pt), aluminum (Al) and palladium (Pd), or an alloy comprising at least one of such metals.

Figure 9A:
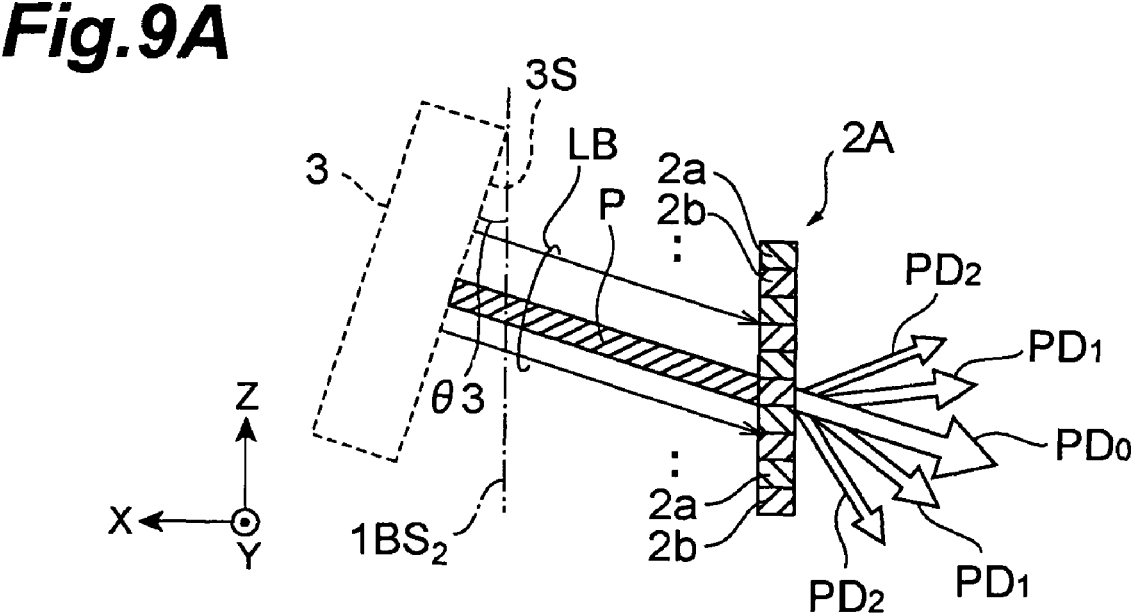
FIG. 9A is a schematic diagram illustrating a relationship between a surface-emitting semiconductor laser and a first diffraction grating.
Figure 9B:
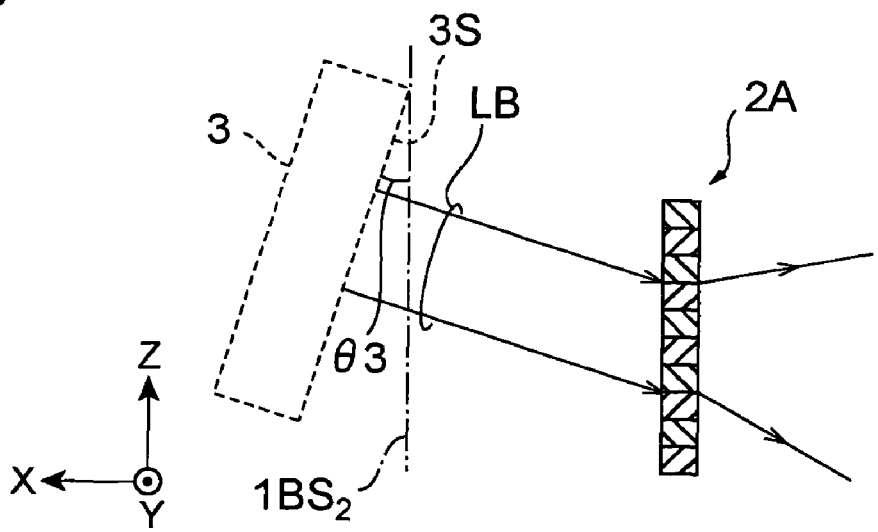
FIG. 9B is a schematic diagram illustrating a relationship between a surface-emitting semiconductor laser and a first diffraction grating.

Optical coupling by the above-described first diffraction gratings 2A and second diffraction gratings 2B is explained in detail next with reference to FIGS. 9A to 10B. FIGS. 9A and 9B are schematic diagrams illustrating the relationship between the surface-emitting semiconductor laser and the first diffraction gratings, and FIGS. 10A and 10B are schematic diagrams illustrating the relationship between the surface-emitting semiconductor laser, the first diffraction gratings, the second diffraction gratings and the optical waveguide core.

When the angle θ3 is an acute angle, the emission light LB of the surface-emitting semiconductor laser 3 strikes the first diffraction gratings 2A not only with a component in the X-axis direction, but also with a component in the Z-axis direction, as illustrated in FIG. 9A. Focusing now on an emission light component P, of the emission light LB, that is incident on one of the low-refractive index layers 2b of the first diffraction gratings 2A, it can be seen that the emission light component P is diffracted by the first diffraction grating 2A, the refractive index thereof changes periodically in the Z-axis direction. After passing through the first diffraction gratings 2A, therefore, the emission light component P splits into diffracted light including, for instance, 1st order diffracted light $PD_1$, 2nd order diffracted light $PD_2$, 3rd order diffracted light $PD_3$ and so forth. (Although fourth- and higher-order diffracted light is also generated, these orders are not shown in the figures.) The 1st order diffracted light $PD_1$ propagates in the same direction as the emission light LB, but the 2nd order diffracted light $PD_2$ and 3rd order diffracted light $PD_3$ and so forth propagate in oblique directions relative to the propagation direction of the emission light LB, in the Z-axis positive or negative direction.

The higher the parallelism of the emission light LB, the more intense the above diffractive phenomenon is. Therefore, the higher the parallelism of the emission light LB, the greater becomes the intensity of the 2nd order diffracted light $PD_2$ and of the 3rd order diffracted light $PD_3$ having also a component in the Z-axis direction. In order to effectively elicit such a diffractive phenomenon, the spot size of the emission light LB must be sufficiently greater than the Z-axis direction thickness of the high-refractive index layers 2a and the low-refractive index layers 2b of the first diffraction gratings 2A.

The above-described diffractive phenomenon occurs at each of the high-refractive index layers 2a and the low-refractive index layers 2b of the first diffraction gratings 2A onto which the emission light LB is incident. After passing through the first diffraction gratings 2A, therefore, the emission light LB becomes a superposition of the 1st order diffracted light $PD_1$, 2nd order diffracted light $PD_2$ and 3rd order diffracted light $PD_3$ and so forth at each of the high-refractive index layers 2a and the low-refractive index layers 2b onto which the emission light LB is incident. Specifically, the emission light LB having passed through the first diffraction gratings 2A travels in the X-axis direction while spreading in the Z-axis direction, as illustrated in FIG. 9B. After passing through the first diffraction gratings 2A, though, the emission light LB spreads more in the Z-axis negative direction than in the Z-axis positive direction.

In the present embodiment, the first diffraction gratings 2A are provided in the optical waveguide core 4, as illustrated in FIG. 10A, and hence part of the emission light LB becomes the first propagation beam $LB_1$ that propagates through the optical waveguide core 4 in the Z-axis negative direction, while another part of the emission light LB becomes the second propagation beam $LB_2$ that propagates through the optical waveguide core 4 in the Z-axis positive direction. Among the emission light LB having passed through the first diffraction gratings 2A, diffracted light having a component in the Z-axis negative direction contributes mainly to the first propagation beam $LB_1$, while diffracted light having a component in the Z-axis positive direction contributes mainly to the second propagation beam $LB_2$. After passing through the first diffraction gratings 2A, though, the emission light LB spreads more in the Z-axis negative direction than in the Z-axis positive direction, and hence the intensity of the second propagation beam $LB_2$ is weaker than the intensity of the first propagation beam $LB_1$.

If no first diffraction gratings 2A are provided, the emission light LB that reaches the optical waveguide core 4 has no component in the Z-axis direction, and hence the intensity of the first propagation beam $LB_1$ and of the second propagation beam $LB_2$ is extremely weak. The first diffraction gratings 2A have the function of reinforcing the intensity of the first propagation beam $LB_1$ and of the second propagation beam $LB_2$, i.e. the function of optically coupling at least part of the emission light LB to the optical waveguide core 4.

As illustrated in FIG. 10A, part of the emission light LB passes through the first diffraction gratings 2A, the optical waveguide core 4 and the second diffraction gratings 2B, and strikes the light reflective section 9 as transmission light LBT. The transmission light LBT is reflected by the light reflective section 9 into reflected light LBR that strikes in turn the second diffraction gratings 2B. As is the case in the first diffraction gratings 2A, the second diffraction gratings 2B have the function of optically coupling part of the light incident thereon to the optical waveguide core 4. As a result, the reflected light LBR is optically coupled by the second diffraction gratings 2B to the optical waveguide core 4, so that part of the reflected light LBR becomes the first propagation beam $LB_1$ traveling through the optical waveguide core 4 in the Z-axis negative direction, while another part of the reflected light LBR becomes the second propagation beam $LB_2$ traveling through the optical waveguide core 4 in the Z-axis positive direction.

Accordingly, the first propagation beam $LB_1$ and the second propagation beam $LB_2$ include the light optically coupled to the optical waveguide core 4 by the first diffraction gratings 2A, from among the emission light LB, and because of the existence of the light reflective section 9, also the transmission light LBT, from among the emission light LB, that passes through the first diffraction gratings 2A, the optical waveguide core 4 and the second diffraction gratings 2B. The intensity of both the first propagation beam $LB_1$ and the second propagation beam $LB_2$ is reinforced therefore through the presence of the light reflective section 9. The light reflective section 9, moreover, prevents the transmission light LBT from propagating beyond the light reflective section 9 towards the first surface $1BS_1$. When the transmission light LBT propagates beyond the light reflective section 9 towards the first surface $1BS_1$, the slider substrate 1A and the magnetic head portion 1B further towards the first surface $1BS_1$ than the light reflective section 9 may expand or deform due to heating by the transmission light LBT. The light reflective section 9 prevents such problems of expansion or deformation of the magnetic head portion 1B and the slider substrate 1A.

As the angle θ3 widens beyond 0 degrees, there decreases the proportion of light, from among the emission light LB, that is transmitted through the first diffraction gratings 2A, but there rises the proportion of light, from among the emission light LB transmitted through the first diffraction gratings 2A, that becomes optically coupled to the interior of the optical waveguide core 4. The intensity of the first propagation beam $LB_1$ is proportional to the value resulting from multiplying these two proportions. For a given intensity of the emission light LB, therefore, the intensity of the first propagation beam $LB_1$ has a peak for a certain value of the angle θ3. The inventors calculated, on the basis of simulations, the dependence of the angle θ3 on the intensity of the first propagation beam $LB_1$, for given intensities of the emission light LB, and found as a result that the intensity of the first propagation beam $LB_1$ becomes particularly high when the angle θ3 ranges from 35 degrees to 60 degrees. Therefore, the angle θ3 is preferably not smaller than 35 degrees and no greater than 60 degrees.

The surface-emitting semiconductor laser 3 is preferably a photonic crystal surface-emitting semiconductor laser, in order to increase the optical coupling efficiency of the first diffraction gratings 2A. Explanations follow next on the rationale for this and on a photonic crystal surface-emitting semiconductor laser.

Figure 11:
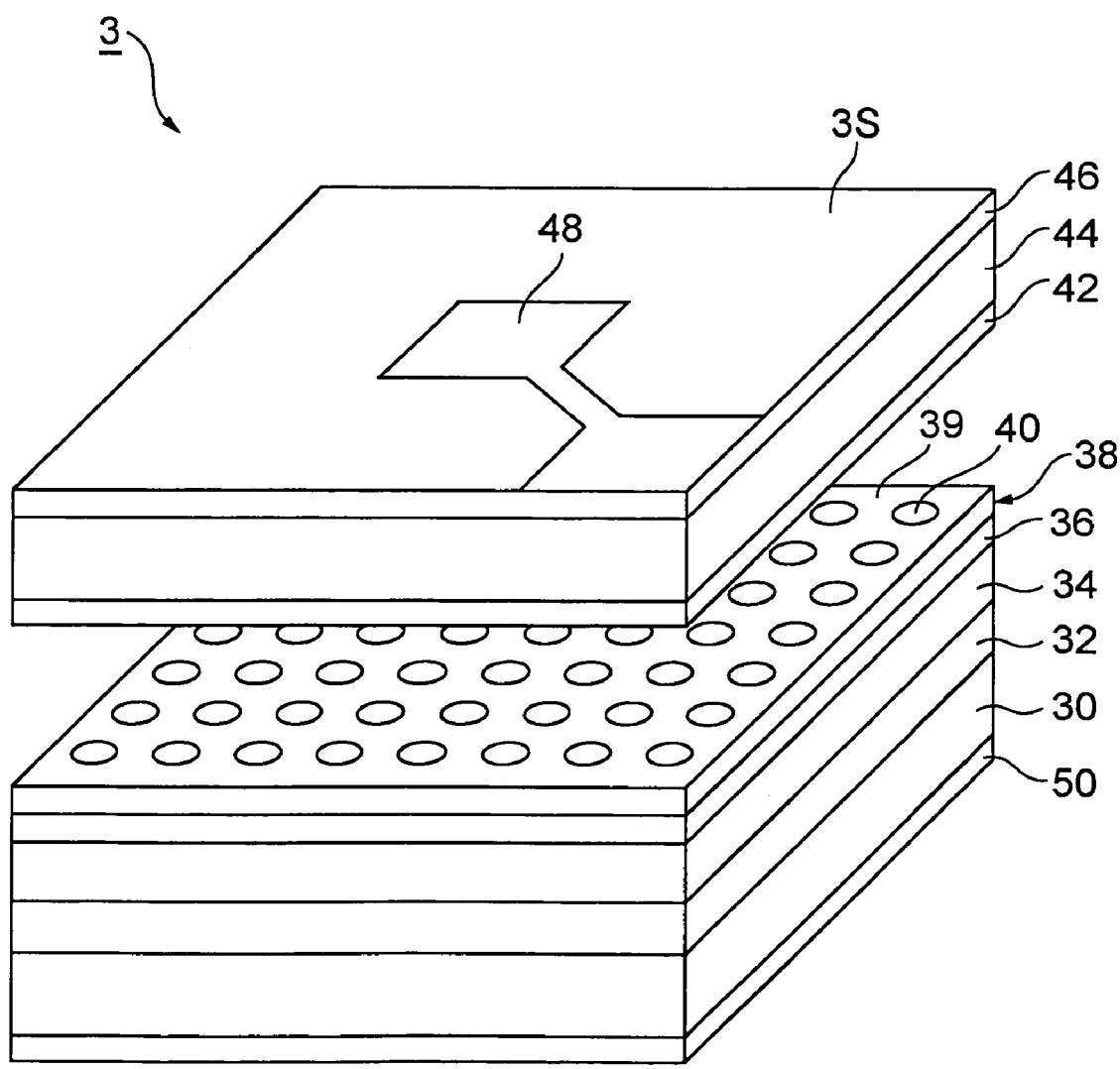
FIG. 11 is a schematic perspective-view diagram of an example of a photonic crystal surface-emitting semiconductor laser.
Figure 12:
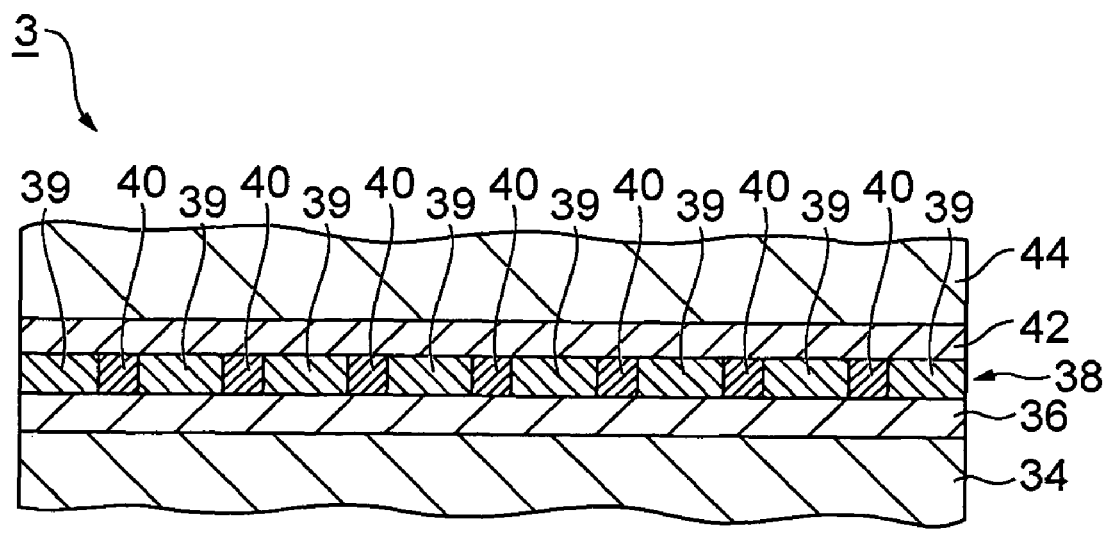
FIG. 12 is a cross-sectional diagram of the photonic crystal surface-emitting semiconductor laser of FIG. 10 in the vicinity of a photonic crystal layer.

FIG. 11 is a schematic perspective-view diagram of an example of a photonic crystal surface-emitting semiconductor laser in which a photonic crystal layer is depicted separated from layers above it. FIG. 12 is a cross-sectional diagram of the photonic crystal surface-emitting semiconductor laser of FIG. 11 in the vicinity of the photonic crystal layer.

As illustrated in FIG. 11, the photonic crystal surface-emitting semiconductor laser 3 comprises a lower cladding layer (substrate) 30 comprising, for instance, n-type AlGaAs; an upper cladding layer 44 comprising, for instance, p-type AlGaAs; an active layer 34 provided between the lower cladding layer 30 and the upper cladding layer 44; and a photonic crystal layer 38 provided between the upper cladding layer 44 and the active layer 34. The active layer 34, which has multiple quantum wells, comprises for instance InGaAs layers and GaAs layers in a multilayer structure. A space layer 32 comprising, for instance, n-type GaAs, is provided between the lower cladding layer 30 and the active layer 34. A spacer layer 36 comprising, for instance, p-type GaAs, is provided between the active layer 34 and the photonic crystal layer 38. A spacer layer 42 comprising, for instance, p-type GaAs, is provided between the photonic crystal layer 38 and the upper cladding layer 44. A p-electrode 48 is provided on the upper cladding layer 44 via a contact layer 46 that comprises, for instance, p-type GaAs, while an n-electrode 50 is provided on the rear face of the lower cladding layer 30.

As illustrated in FIGS. 11 and 12, the photonic crystal layer 38 is a two-dimensional photonic crystal layer. Specifically, the photonic crystal layer 38 has a base layer 39 comprising, for instance, p-type GaAs, and a plurality of cavities 40 provided in the base layer 39. The cavities 40, which run through the base layer 39 in the thickness direction of the latter, have for instance a circular cross-sectional shape. The cavities 40 are arranged periodically in a two-dimensional pattern within the plane of the base layer 39, forming, for instance, a two-dimensional square lattice.

The thickness of the photonic crystal layer 38 ranges, for instance, from 0.1 to 0.5 µm. The diameter of the cross section of the cavities 40 ranges, for instance, from 0.05 to 0.2 µm. The oscillation wavelength of the photonic crystal surface-emitting semiconductor laser 3 is determined on the basis of the array period of the cavities 40, as described below. The array period of the cavities 40 ranges, for instance, from 0.1 to 0.4 µm.

When voltage is applied between the p-electrode 48 and the n-electrode 50 of the photonic crystal surface-emitting semiconductor laser 3, electrons and positive holes recombine in the active layer 34, generating light in the process. From among the generated light, light having a wavelength commensurate with the period of the array of the cavities 40 resonates within the photonic crystal layer 38.

When traveling from a given cavity 40 to another cavity 40, light having a wavelength commensurate with the period of the array of the cavities 40 is diffracted in the 180 degree direction, the +90 degree direction and the −90 degree direction relative to the travel direction of the light, through the effect of the periodic structure of the cavities 40. Light beams propagating in these four directions are coupled with each other, resonating in two dimensions within the photonic crystal layer 38. This light resonating in two dimensions is also diffracted in the thickness direction of the photonic crystal layer 38 on account of the periodic structure of the cavities 40. As a result, a laser beam is outputted from the light exit surface 3S, which is the surface of the contact layer 46, in a direction perpendicular to the light exit surface 3S.

Such a photonic crystal surface-emitting semiconductor laser 3 affords a larger spot size of the emission light in a single-mode operation, and allows reducing the divergence angle of the emission light (i.e. affords higher parallelism), as compared with a surface-emitting semiconductor laser having no photonic crystal layer. As described above, the optical coupling efficiency of the first diffraction gratings 2A becomes higher as the divergence angle of the emission light LB becomes narrower and the spot size of the emission light LB increases. Therefore, the spot size of the emission light LB is preferably not smaller than 10 µm, more preferably not smaller than 50 µm. Similarly, the divergence angle of the emission light LB is preferably no greater than 10 degrees, more preferably no greater than 5 degrees. The photonic crystal surface-emitting semiconductor laser 3 allows easily satisfying these preferred conditions as regards spot size and divergence angle of the emission light LB. The magnetic recording medium 10 can be heated to a higher temperature by increasing the optical coupling efficiency of the first diffraction gratings 2A through the use of the photonic crystal surface-emitting semiconductor laser 3. This affords as a result a thermally assisted magnetic head 21 capable of coping with higher recording densities. The upper limit of the spot size of the emission light LB is not particularly limited, but may be of about 200 µm, given that the photonic crystal surface-emitting semiconductor laser 3 is to be used in a magnetic head.

In the photonic crystal layer 38 of the photonic crystal surface-emitting semiconductor laser 3, the cavities 40 arranged periodically in two dimensions may be replaced by a filling material having a refractive index different from that of the base layer 39.

As illustrated in FIG. 3, an electrode pad group G1, comprising a plurality of electrode pads, is formed on the second surface $1BS_2$ of the magnetic head portion 1B. These electrode pads are electrically connected to the p-electrode and the n-electrode of the surface-emitting semiconductor laser 3, the two ends of the coil 5, the upper and lower electrodes of the MR element 7 and a pair of electrodes of the photodiode 19. During writing, the magnetoresistance of the MR element 7 varies in response to the magnetic field generated around the recording region R, whereupon there varies also the current flowing between a pair of electrode pads in the electrode pad group G1. The information written in the recording region R can be read as a result.

During writing, driving current is caused to flow between the pair of electrode pads connected to the p-electrode and the n-electrode of the surface-emitting semiconductor laser 3, as a result of which the surface-emitting semiconductor laser 3 outputs the emission light LB. Thereby, the first propagation beam $LB_1$ strikes the plasmon antenna 8, whereupon the latter heats the recording region R of the magnetic disk 10 nearby. The magnetic disk 10 moves in the direction denoted by arrow AR in the figure, so that the leading end of the main magnetic pole 6A becomes positioned, immediately after heating, over the heated recording region R. Current is then made to flow between another pair of electrode pads of the electrode pad group G1, such that the current flows between the ends of the coil 5. The magnetic flux generated as a result by the coil S reaches the end face 6AE of the main magnetic pole 6A, whereupon magnetic field lines MF exiting through the end face 6AE of the main magnetic pole 6A traverse the magnetic disk 10 and return to the auxiliary magnetic pole 6B. Information is written thereby in the recording region R of the magnetic disk 10.

The second propagation beam $LB_2$ exits through the second light exit surface 4C upon emission light LB from the surface-emitting semiconductor laser 3. The second propagation beam $LB_2$ strikes the photodiode 19, by way of which the intensity of the second propagation beam $LB_2$ is measured. The electrode pads in the electrode pad group G1 are electrically connected to a second electrode pad group G2 formed on the suspension 20, and to the exterior, via the wiring member 203.

Figure 13:
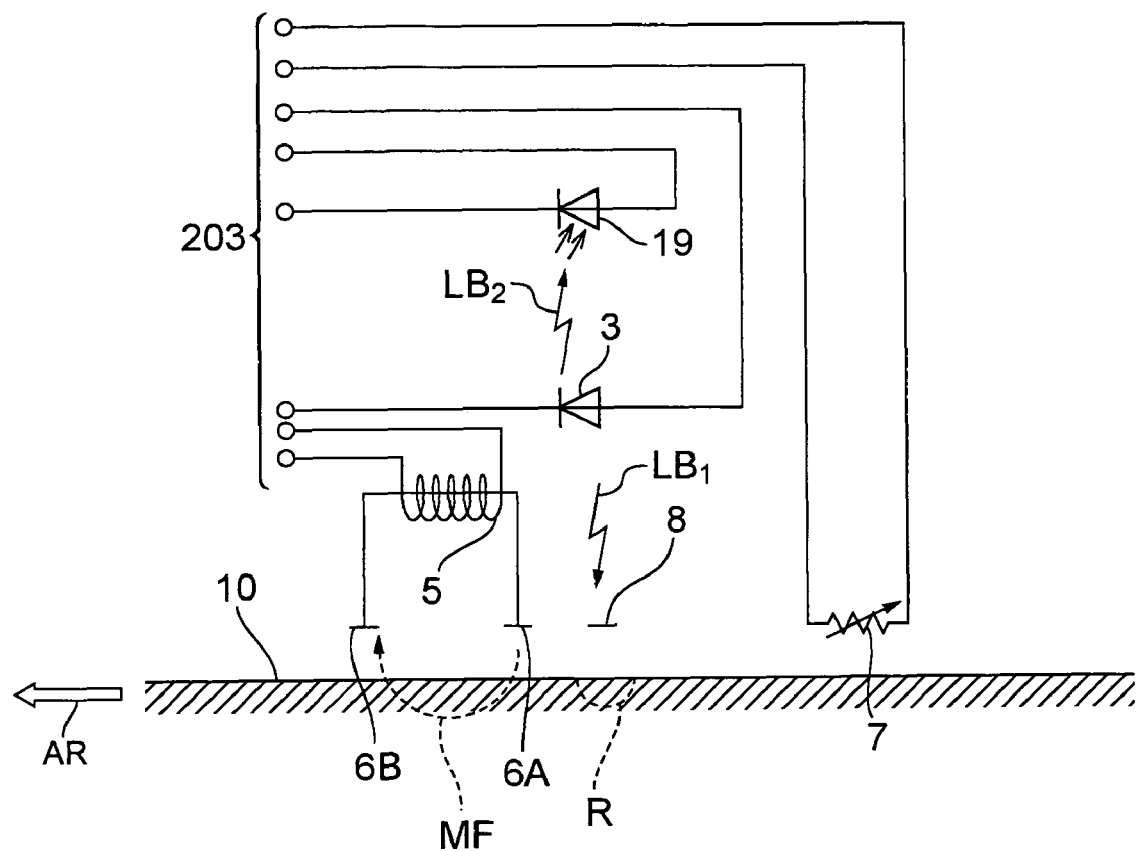
FIG. 13 is a diagram illustrating electric connections of a thermally assisted magnetic head.

FIG. 13 is a diagram illustrating electric connections of the thermally assisted magnetic head.

The surface-emitting semiconductor laser 3, the coil 5, both ends of the MR element 7 and a pair of electrodes of the photodiode 19 are connected to the wiring member 203. The surface-emitting semiconductor laser 3 and the coil 5 are energized via the wiring member 203. The output from the MR element 7 is read out via the wiring member 203. The intensity of the second propagation beam $LB_2$ is measured by way of the photodiode 19.

A method for manufacturing the thermally assisted magnetic head according to the present embodiment will be explained next with reference to FIGS. 14A to 16B. FIGS. 14A to 16B are perspective-view diagrams illustrating a method for manufacturing a thermally assisted magnetic head.

Figure 14A:
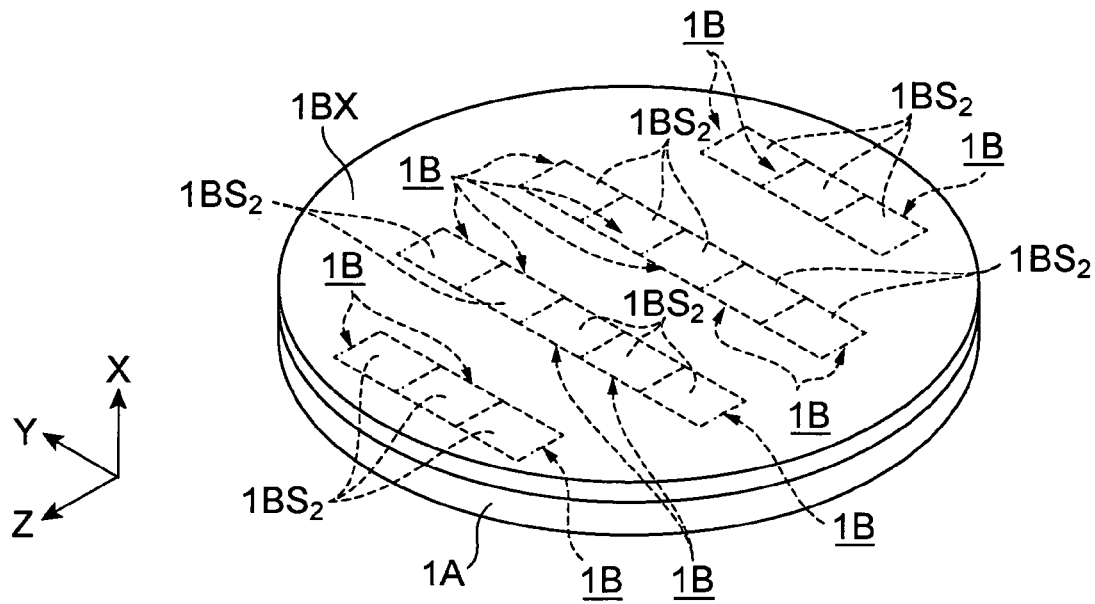
FIG. 14A is a perspective-view diagram illustrating a method for manufacturing a thermally assisted magnetic head.

Firstly, a magnetic head portion build-up layer 1BX comprising a plurality of regularly arrayed magnetic head portions 1B is formed on a main plane (corresponding to the head stacking surface 1AS in FIG. 4) of the slider substrate 1A, as illustrated in FIG. 14A. The plane at which the medium-facing surface of the magnetic head portions 1B is to be formed is parallel to the XY plane, in the Z-axis negative direction of the magnetic head portions 1B. Thus, the second surface $1BS_2$ of the magnetic head portions 1B is comprised in the surface of the magnetic head portion build-up layer 1BX.

Figure 14B:
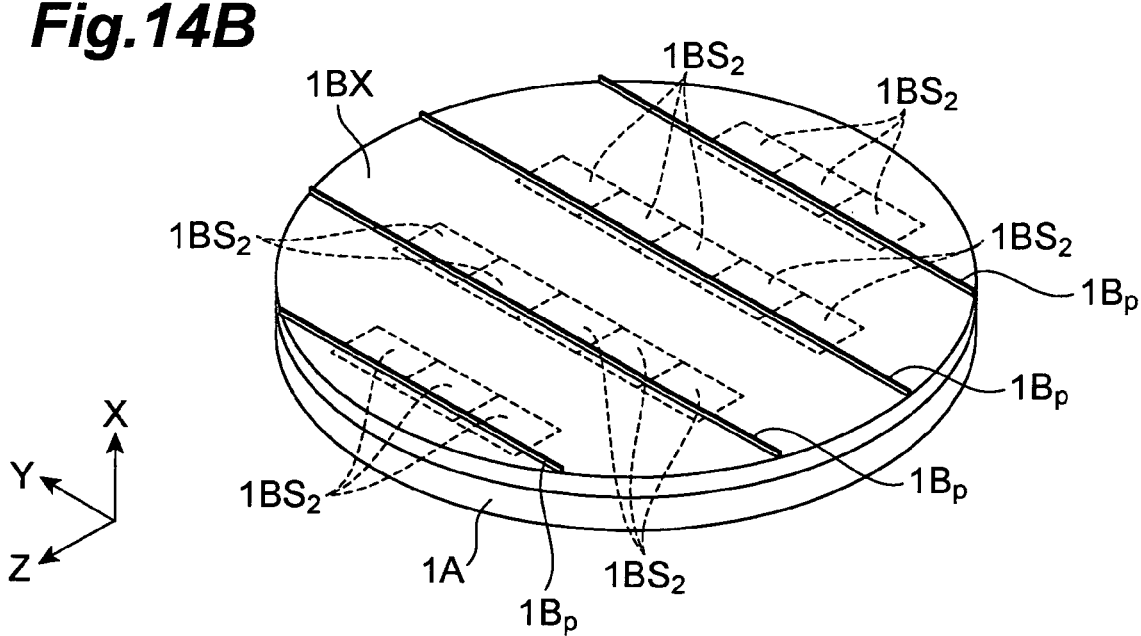
FIG. 14B is a perspective-view diagram illustrating a method for manufacturing a thermally assisted magnetic head.

Protrusion $1B_p$ protruding in the X-axis positive direction and extending in the Y-axis direction are formed next as shown in FIG. 14B. The protrusions $1B_p$ may be formed as separate members, on the second surface $1BS_2$ of FIG. 14A, or alternatively, regions of the second surface $1BS_2$ other than the regions intended for forming the protrusions $1B_p$ may be removed through polishing, to form thereby the protrusions $1B_p$.

Figure 15A:
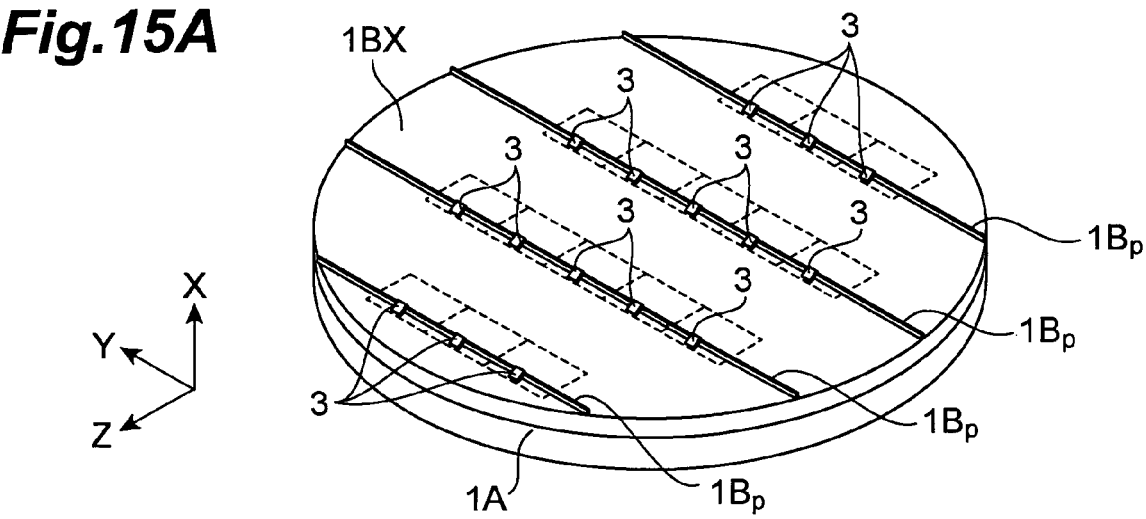
FIG. 15A is a perspective-view diagram illustrating a method for manufacturing a thermally assisted magnetic head.

The relative positions of the surface-emitting semiconductor laser 3 and the second surface $1BS_2$ are fixed next in such a manner that the light exit surface of the surface-emitting semiconductor laser 3 is in contact with both the second surface $1BS_2$ and the protrusions $1B_p$, as illustrated in FIG. 15A.

Figure 15B:
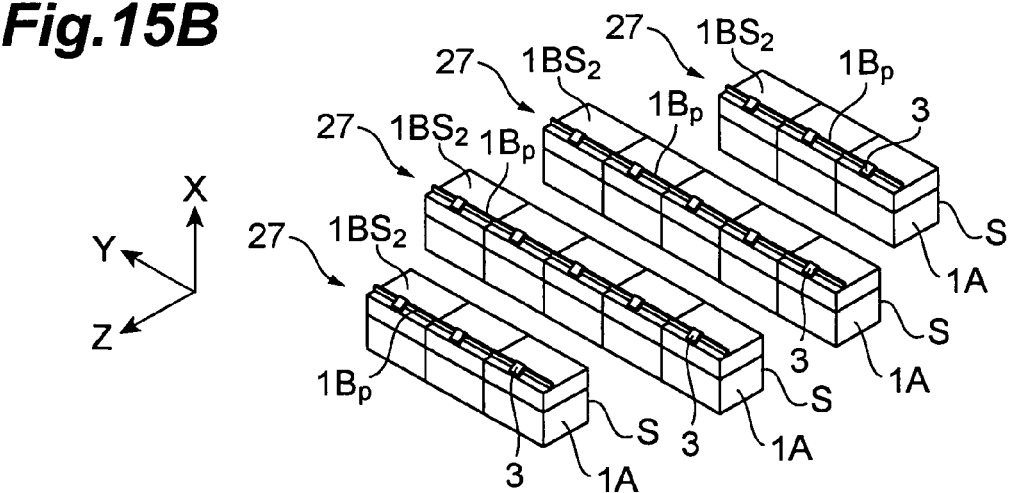
FIG. 15B is a perspective-view diagram illustrating a method for manufacturing a thermally assisted magnetic head.
Figure 16A:
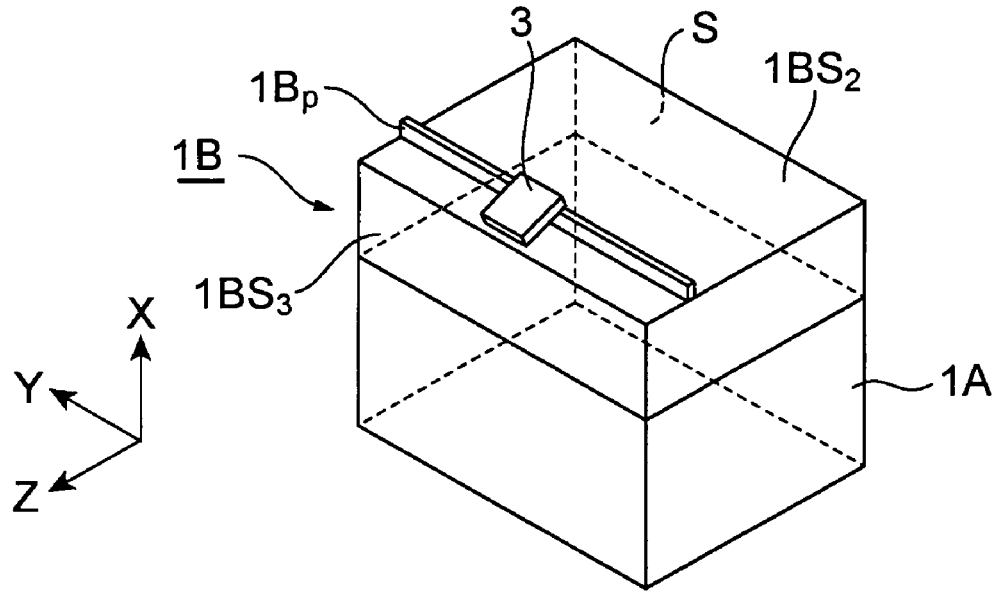
FIG. 16A is a perspective-view diagram illustrating a method for manufacturing a thermally assisted magnetic head.
Figure 16B:
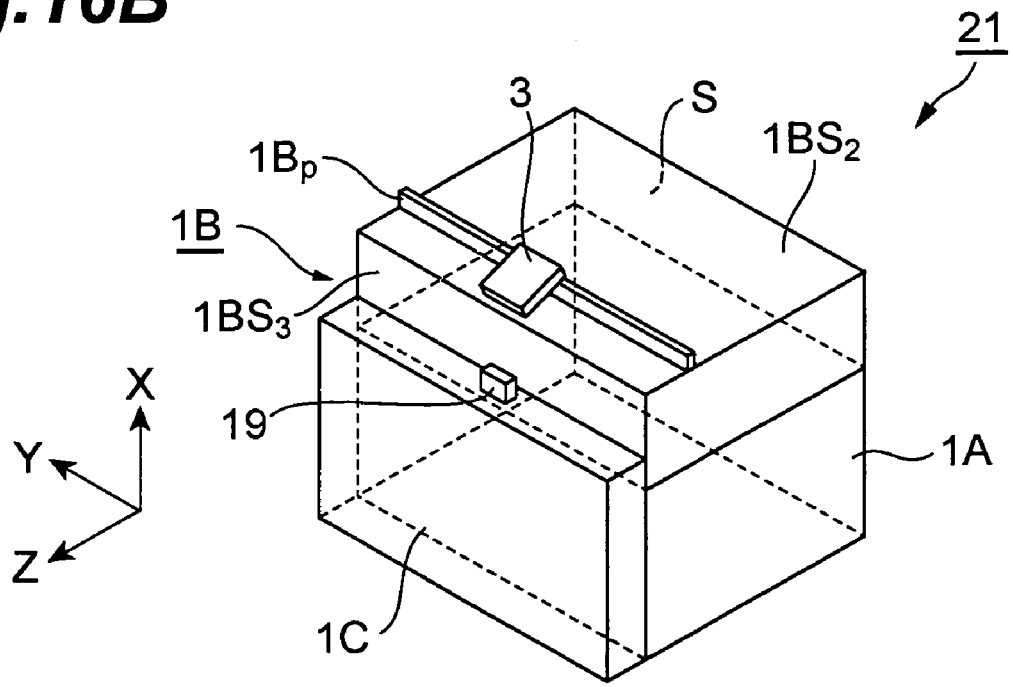
FIG. 16B is a perspective-view diagram illustrating a method for manufacturing a thermally assisted magnetic head.

Slider bars 27, comprising each a plurality of magnetic head portions 1B lined up in a row, are manufactured next by slicing the slider substrate 1A along planes parallel to the XY plane, as illustrated in FIG. 15B. The surface of the slider bars 27 that is parallel to the XY plane in the Z-axis negative direction yields the medium-facing surface S. After polishing or the like of the medium-facing surface S, the slider bars 27 are diced so as to separate individually the plural magnetic head portions 1B, as illustrated in FIG. 16A. The photodiode 19 and the support member 1C are provided next, as illustrated in FIG. 16B, to manufacture a plurality of thermally assisted magnetic heads 21.

In the thermally assisted magnetic head 21 according to the above-described embodiment, the second surface $1BS_2$ that is to oppose the surface-emitting semiconductor laser 3 is exposed at a state in which magnetic head portions 1B are formed on the slider substrate 1A (FIGS. 14A, 14B and 15A). Therefore, the surface-emitting semiconductor lasers 3 corresponding to the respective magnetic head portions 1B are collectively caused to face the second surface $1BS_2$ at a time. In that state, it is possible to collectively fix the relative positions of the magnetic head portions 1B and the surface-emitting semiconductor lasers 3 at a time.

The thermally assisted magnetic head 21 according to the present embodiment does not comprise an end surface-emitting semiconductor laser, but the surface-emitting semiconductor laser 3. In an end surface-emitting semiconductor laser, emission light is outputted in a direction parallel to the main plane of the semiconductor substrate, from an end surface formed by cleaving the semiconductor substrate at a plane perpendicular to the main plane of the semiconductor substrate. (In an end surface-emitting semiconductor laser shaped as a rectangular parallelepiped like the slider 1, having a medium-facing surface S of comparatively large area and a second surface $1BS_2$ of comparatively small area, laser light is emitted from a plane corresponding to the second surface $1BS_2$.) By contrast, the surface-emitting semiconductor laser 3 outputs emission light LB in a direction perpendicular to the main plane of the semiconductor substrate. (In a surface-emitting semiconductor laser shaped as a rectangular parallelepiped like the slider 1, having a medium-facing surface S of comparatively large area and a second surface $1BS_2$ of comparatively small area, laser light is emitted from a plane corresponding to the medium-facing surface S.) Therefore, the area of the light exit surface 3S of the surface-emitting semiconductor laser 3 is larger than the area of the light exit surface of an end surface-emitting semiconductor laser. As a result, when the surface-emitting semiconductor laser 3 is provided in such a manner that the emission light LB is incident on the first diffraction gratings 2A, the second surface 1BS₂ is caused to stand opposite the light exit surface 3S, which has a larger area than the light exit surface of an end surface-emitting semiconductor laser. This allows fixing the relative positions of the magnetic head portions 1B and the surface-emitting semiconductor lasers 3 more easily than when using end surface-emitting semiconductor lasers (FIG. 4, FIG. 15A). The thermally assisted magnetic head 21 according to the present embodiment is therefore superior in terms of mass production.

In the thermally assisted magnetic head 21 according to the present embodiment, moreover, at least part of the emission light LB from the surface-emitting semiconductor laser 3 is coupled, by way of the first diffraction gratings 2A, to the optical waveguide core 4 in the magnetic head portion 1B. Therefore, at least part of the emission light LB from the surface-emitting semiconductor laser 3 can be outputted through the first light exit surface 4B of the medium-facing surface S of the magnetic head portion 1B (FIGS. 4, 6 and 7). As a result, the time elapsed since heating of the magnetic recording medium 10 until application of a write magnetic field to the magnetic recording medium 10 can be shortened vis-á-vis the time elapsed in thermally assisted magnetic heads where emission light from a light source is irradiated directly onto the magnetic recording medium. The thermally assisted magnetic head can readily cope thereby with high recording densities.

In the thermally assisted magnetic head 21 according to the present embodiment, moreover, the reflected light LBR, which is part of the emission light LB from the surface-emitting semiconductor laser 3 reflected by the light reflective section 9, is incident on the optical waveguide core 4, such that part of that incident light propagates through the optical waveguide core 4 and exits through the second light exit surface 4C as the second propagation beam LB₂ (FIG. 10B). The intensity of the second propagation beam LB₂ exiting through the second light exit surface 4C is proportional to the intensity of the emission light LB from the surface-emitting semiconductor laser 3. Therefore, the intensity of the emission light LB from the surface-emitting semiconductor laser 3 can be calculated on the basis of the intensity of the second propagation beam LB₂ that exits through the second light exit surface 4C. As a result, the driving current value in the surface-emitting semiconductor laser 3 can be regulated in such a way so as to keep the intensity of the emission light LB constant, which allows suppressing intensity changes in the emission light LB from the surface-emitting semiconductor laser 3.

Thus, the thermally assisted magnetic head 21 according to the present embodiment boasts high mass productivity, can readily cope with high recording densities, and allows suppressing changes in the intensity of emission light from a semiconductor laser.

The thermally assisted magnetic head 21 according to the present embodiment further comprises a photodiode provided opposite the second light exit surface 4C (FIGS. 3 and 4). As a result, the intensity of the second propagation beam LB₂ exiting through the second light exit surface 4C can be measured by way of the photodiode.

In the present embodiment, the magnetic head portion 1B also comprises second diffraction gratings 2B provided in the optical waveguide core 4 further toward the first surface than the first diffraction gratings 2A. The refractive index in the second diffraction gratings 2B changes periodically in the direction along which the optical waveguide core 4 extends (FIGS. 4 and 6).

The second diffraction gratings 2B increase thereby the optical coupling efficiency of the reflected light LBR, resulting from reflection of the emission light LB from the surface-emitting semiconductor laser 3 at the light reflective section 9, to the optical waveguide core 4. The intensity of the second propagation beam LB₂ exiting through the second light exit surface 4C becomes stronger as a result, whereby the intensity of the emission light LB from the surface-emitting semiconductor laser 3 can be calculated more accurately.

In the present embodiment, the relative positions of the surface-emitting semiconductor laser 3 and the slider 1 are fixed in such a manner that the hypothetical plane 3SE parallel to the light exit surface 3S of the surface-emitting semiconductor laser 3 intersects the second surface 1BS₂ of the magnetic head portion 1B at an acute angle θ3, and in such a manner that the emission light LB of the surface-emitting semiconductor laser 3 has a component in the Z-axis negative direction immediately after emission (FIGS. 3 and 4).

This allows raising the proportion of emission light that becomes coupled to the optical waveguide core 4 via the first diffraction gratings 2A and that is aimed towards the first light exit surface 4B, from among the emission light LB of the surface-emitting semiconductor laser 3 (FIGS. 9A to 10B). The magnetic recording medium 10 can be heated as a result to a higher temperature, which affords as a result a thermally assisted magnetic head 21 capable of coping with higher recording densities.

The head gimbal assembly HGA according to the present embodiment comprises the above-described thermally assisted magnetic head 21, and hence the head gimbal assembly according to the present embodiment boasts high mass productivity, can readily cope with high recording densities, and allows suppressing changes in the intensity of emission light from a semiconductor laser.

Likewise, the hard disk drive 100 according to the present embodiment comprises the above-described thermally assisted magnetic head 21, and hence the hard disk drive according to the present embodiment boasts high mass productivity, can readily cope with high recording densities, and allows suppressing changes in the intensity of emission light from a semiconductor laser.

The present invention is not limited to the above embodiments, and may encompass numerous modifications.

Figure 17:
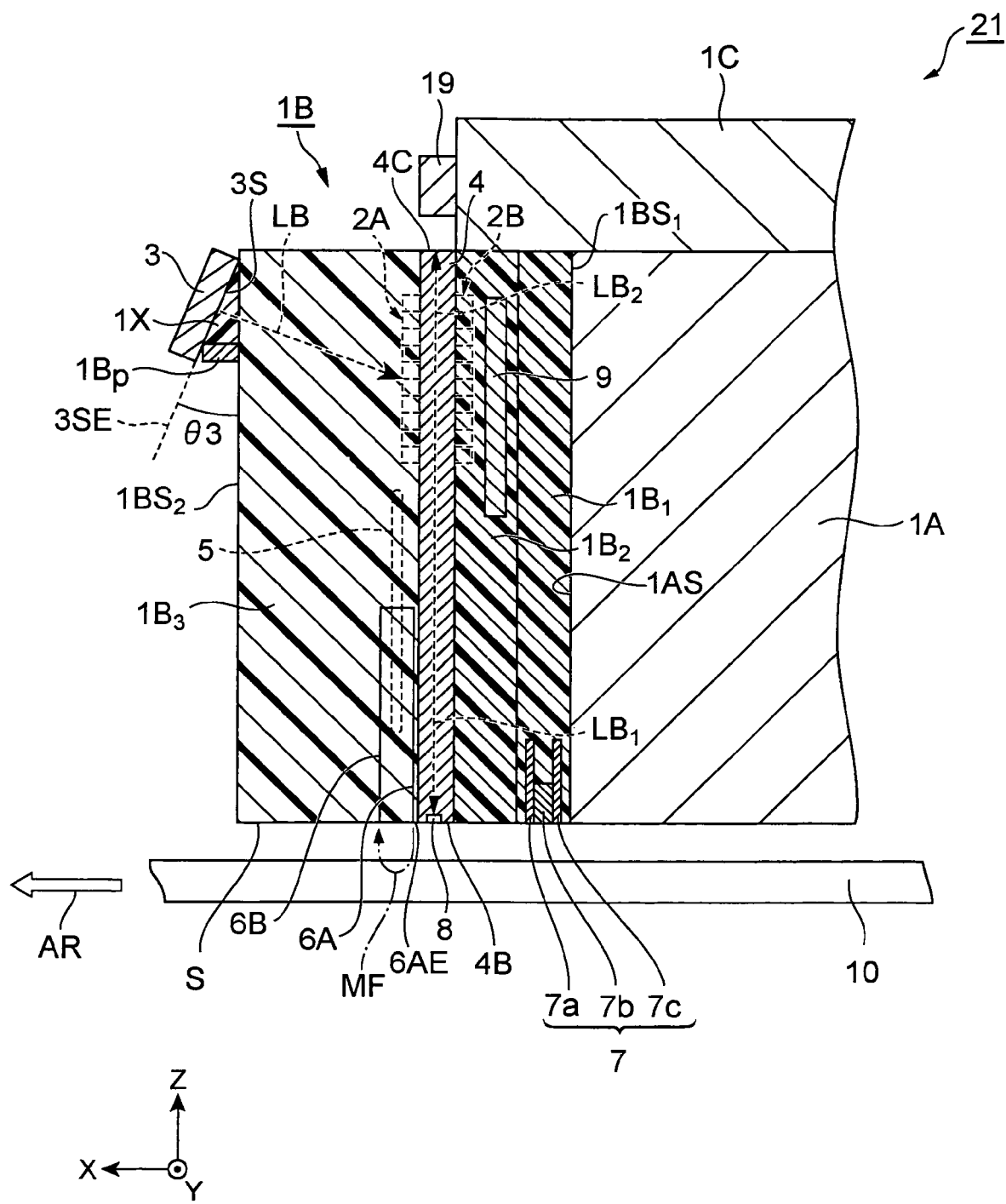
FIG. 17 is a cross-sectional diagram of a modification of a thermally assisted magnetic head 21.

FIG. 17, corresponding to FIG. 4, is a cross-sectional diagram of another modification of the thermally assisted magnetic head 21. The pair of first diffraction gratings 2A need not necessarily be provided within the optical waveguide core 4. So long as the emission light LB can be incident on the first diffraction gratings 2A, and so long as at least part of the emission light LB can be optically coupled to the optical waveguide core 4, the pair of first diffraction gratings 2A may be provided further toward the second surface 1BS₂ than the optical waveguide core 4, as illustrated in FIG. 17. In this case, the pair of first diffraction gratings 2A may be in contact with the YZ plane of the optical waveguide core 4 in the X-axis positive direction, as illustrated in FIG. 17, or may be spaced from the optical waveguide core 4.

As illustrated in FIG. 17, the pair of second diffraction gratings 2B need not necessarily be provided within the optical waveguide core 4. So long as the reflected light LBR can be incident on the second diffraction gratings 2B, and so long as at least part of the reflected light LBR can be optically coupled to the optical waveguide core 4 (FIG. 10B), the pair of second diffraction gratings 2B may be provided between the optical waveguide core 4 and the light reflective section 9. The pair of second diffraction gratings 2B, moreover, may be omitted. In this case, part of the reflected light LBR is optically coupled to the optical waveguide core 4, and propagates through the optical waveguide core 4 and exits through the second light exit surface 4C as the second propagation beam $LB_2$ (FIG. 10B).

The photodiode 9 in the above embodiment is used as a light intensity measuring section. However, a metal or a semiconductor whose resistance increases with rising temperature may also be used as the light intensity measuring section.

The relative position of the surface-emitting semiconductor laser 3 and the slider 1 may be fixed in such a manner that the hypothetical plane 3SE parallel to the light exit surface 3S of the surface-emitting semiconductor laser 3 is parallel to the second surface $1BS_2$ of the magnetic head portion 1B (FIG. 4). For instance, the relative positions of the surface-emitting semiconductor laser 3 and the slider 1 may be fixed by fixing the entire light exit surface 3S against the second surface $1BS_2$.

In the above embodiment, the support member 1C is provided on the slider substrate 1A, and the photodiode 19 is fixed to the support member 1C in such a manner that the photodiode 19 and the second light exit surface 4C oppose each other (FIG. 4). However, the embodiment is not limited to the above configuration, so long as the photodiode 19 can receive emission light (second propagation beam $LB_2$) from the second light exit surface 4C. For instance, the photodiode 19 may be fixed to the suspension 20 (FIG. 3) in such a manner that the photodiode 19 and the second light exit surface 4C oppose each other, with no support member 1C provided in the slider substrate 1A.

As described above, the surface-emitting semiconductor laser 3 is preferably a photonic crystal surface-emitting semiconductor laser, but may also be a surface-emitting semiconductor laser having no photonic crystal layer.

In the above-described embodiment, the pair of first diffraction gratings 2A and the pair of second diffraction gratings 2B are each provided in such a manner that the gratings are spaced apart from each other symmetrically with respect to the symmetry axis 4R of the optical waveguide core 4, as illustrated in FIGS. 5 and 6. However, one or both of the pair of first diffraction gratings 2A and the pair of second diffraction gratings 2B may also be disposed in such a manner that the gratings extend, parallel to the Y-axis, up to the symmetry axis 4R, yielding as a result one first diffraction grating 2A and/or one second diffraction grating 2B that is/are symmetrical in the Y-axis direction relative to the symmetry axis 4R.

The shape of the optical waveguide core 4 is not limited to the shape in the above-described embodiment. The optical waveguide core 4 may be shaped as a plate extending linearly in the Z-axis direction, the thickness direction of the plate being the X-axis direction.

A near-field light generating section such as the plasmon antenna 8 need not necessarily be provided at the first light exit surface 4B. The first propagation beam $LB_1$ may be emitted directly from the first light exit surface 4B onto the magnetic recording medium 10 (FIGS. 4 to 7).

In the above embodiment, the protrusion $1B_p$ is formed on the second surface $1BS_2$, and the surface-emitting semiconductor laser 3 is provided at the second surface $1BS_2$ in such a manner that the light exit surface 3S of the surface-emitting semiconductor laser 3 is in contact with both the second surface $1BS_2$ and the protrusion $1B_p$, as a result of which the hypothetical plane 3SE parallel to the light exit surface 3S of the surface-emitting semiconductor laser 3 intersects the second surface $1BS_2$ at an acute angle θ3 (FIG. 4). However, the present invention is not limited thereto, and for instance the second surface $1BS_2$ may be tilted in a direction so as to intersect the Z-axis at an acute angle θ3, without any protrusion $1B_p$ being formed on the second surface $1BS_2$, the surface-emitting semiconductor laser 3 being then fixed to the second surface $1BS_2$ in such a manner that the entire light exit surface 3S of the surface-emitting semiconductor laser 3 is in contact with the second surface $1BS_2$.

What is claimed is:

1. A thermally assisted magnetic head, comprising:
a slider having a medium-facing surface; and
a surface-emitting semiconductor laser,
wherein the slider has:
a slider substrate on which part of the medium-facing surface is formed; and
a magnetic head portion, on which another part of the medium-facing surface is formed, and which has a first surface in contact with a head stacking surface of the slider substrate, a second surface opposite the first surface, and a third surface opposite the medium-facing surface,
the magnetic head portion comprises:
a main magnetic pole that generates a write magnetic field from an end face on the side of the medium-facing surface;
an optical waveguide core, extending along the first surface, and having a first light exit surface at the medium-facing surface and a second light exit surface at the third surface;
a first diffraction grating, which is provided in the optical waveguide core or further towards the second surface than the optical waveguide core, and the refractive index of which changes periodically in a direction in which the optical waveguide core extends; and
a light reflective section provided further toward the first surface than the optical waveguide core, wherein
the surface-emitting semiconductor laser is provided opposing the second surface in such a manner that emission light therefrom is incident onto the first diffraction grating and the light reflective section,
the first diffraction grating causes part of emission light from the surface-emitting semiconductor laser to be optically coupled to the optical waveguide core, and
the light reflective section reflects the emission light from the surface-emitting semiconductor laser which passes through the optical waveguide core in a direction which intersects the direction in which the optical waveguide core extends such that the emission light from the surface-emitting semiconductor laser which passes through the optical waveguide core becomes incident on the optical waveguide core.

2. The thermally assisted magnetic head according to claim 1, further comprising a light intensity measuring section that receives light exiting through the second light exit surface.

3. The thermally assisted magnetic head according to claim 1, wherein the surface-emitting semiconductor laser is a photonic crystal surface-emitting semiconductor laser.

4. The thermally assisted magnetic head according to claim 1, wherein the magnetic head portion further comprises a second diffraction grating provided in the optical waveguide core, further toward the first surface than the first diffraction grating, or provided between the optical waveguide core and the light reflective section,
the refractive index of the second diffraction grating changing periodically in the direction in which the optical waveguide core extends.

5. The thermally assisted magnetic head according to claim 1, wherein the position of the surface-emitting semiconductor laser relative to the slider is fixed in such a manner that a plane parallel to a light exit surface of the surface-emitting semiconductor laser intersects the second surface of the magnetic head portion at an acute angle, and in such a manner that emission light of the surface-emitting semiconductor laser has, immediately after being emitted, a component in a direction from the second light exit surface towards the first light exit surface of the optical waveguide core.

6. The thermally assisted magnetic head according to claim 5, further comprising a UV-curable resin provided between the surface-emitting semiconductor laser and the second surface of the magnetic head portion.

7. A head gimbal assembly, comprising:
the thermally assisted magnetic head according to claim 1; and
a suspension onto which the thermally assisted magnetic head is mounted.

8. A hard disk drive, comprising:
the head gimbal assembly according to claim 7; and
a magnetic recording medium facing the medium-facing surface.

* * * * *